United States Patent
Toshihiro

(10) Patent No.: US 10,412,264 B2
(45) Date of Patent: Sep. 10, 2019

(54) IMAGE PROCESSING APPARATUS AND METHOD FOR GENERATING A BINARY IMAGE WITH AREAS HAVING DIFFERENT RATIOS OF CHANGE IN GRADATION FORMED BY DIFFERENT DOT PATTERNS ALTERNATINGLY DISPOSED

(71) Applicant: Funai Electric Co., Ltd., Osaka (JP)

(72) Inventor: Shunsaku Toshihiro, Kishiwada (JP)

(73) Assignee: Funai Electric Co., LTD., Osaka (JP)

( * ) Notice: Subject to any disclaimer, the term of this patent is extended or adjusted under 35 U.S.C. 154(b) by 0 days.

(21) Appl. No.: 15/662,945

(22) Filed: Jul. 28, 2017

(65) Prior Publication Data

US 2018/0035009 A1 Feb. 1, 2018

(30) Foreign Application Priority Data

Jul. 29, 2016 (JP) .................. 2016-150565

(51) Int. Cl.
*H04N 1/405* (2006.01)
*H04N 1/409* (2006.01)
*G06K 15/02* (2006.01)

(52) U.S. Cl.
CPC ....... *H04N 1/4055* (2013.01); *G06K 15/1881* (2013.01); *H04N 1/409* (2013.01); *H04N 1/4058* (2013.01)

(58) Field of Classification Search
CPC combination set(s) only.
See application file for complete search history.

(56) References Cited

U.S. PATENT DOCUMENTS

| 6,281,924 | B1 | 8/2001 | Tsuzuki | |
|---|---|---|---|---|
| 6,975,431 | B1 * | 12/2005 | Sugizaki | H04N 1/4055 358/1.9 |
| 7,286,266 | B2 * | 10/2007 | Fujita | G06K 15/1223 358/3.06 |
| 8,553,287 | B2 * | 10/2013 | Yasutomi | H04N 1/4058 358/3.06 |

(Continued)

FOREIGN PATENT DOCUMENTS

| JP | 57119562 A | * | 7/1982 | ............ H04N 1/405 |
|---|---|---|---|---|
| JP | H08-195882 A | | 7/1996 | |
| JP | 2007-67984 A | | 3/2007 | |

OTHER PUBLICATIONS

Extended European Search Report in counterpart European Application No. 17 18 3616.6 dated Nov. 29, 2017 (7 pages).

(Continued)

*Primary Examiner* — Scott A Rogers
(74) *Attorney, Agent, or Firm* — Osha Liang LLP

(57) ABSTRACT

An image processing apparatus includes a scanner that acquires an image, and a processor that changes areas of a plurality of dot patterns in accordance with gradation values in the image using a plurality of dither matrices, and generates a binary image based on the plurality of dot patterns. A change rate of each of the areas differs from each other. The plurality of dither matrices include a first dither matrix and a second dither matrix. A first change rate of a first area of a plurality of first dot patterns formed based on the first dither matrix and a second change rate of a second area of a plurality of second dot patterns formed based on the second dither matrix differ.

16 Claims, 23 Drawing Sheets

(56) References Cited

U.S. PATENT DOCUMENTS

| | | | |
|---|---|---|---|
| 9,087,291 B2* | 7/2015 | Hori | G06K 15/1881 |
| 2008/0123148 A1 | 5/2008 | Takahashi et al. | |
| 2008/0309983 A1 | 12/2008 | Mizutani | |
| 2011/0058224 A1 | 3/2011 | Saito et al. | |
| 2014/0139855 A1* | 5/2014 | Iguchi | H04N 1/4015 |
| | | | 358/1.9 |
| 2017/0289399 A1* | 10/2017 | Toshihiro | G06T 7/11 |

OTHER PUBLICATIONS

Office Action issued in European Application No. 17183616.6, dated Nov. 9, 2018 (5 pages).
Office Action issued in Chinese Application No. 201710638976.5, dated Jan. 31, 2019 (8 pages).

* cited by examiner

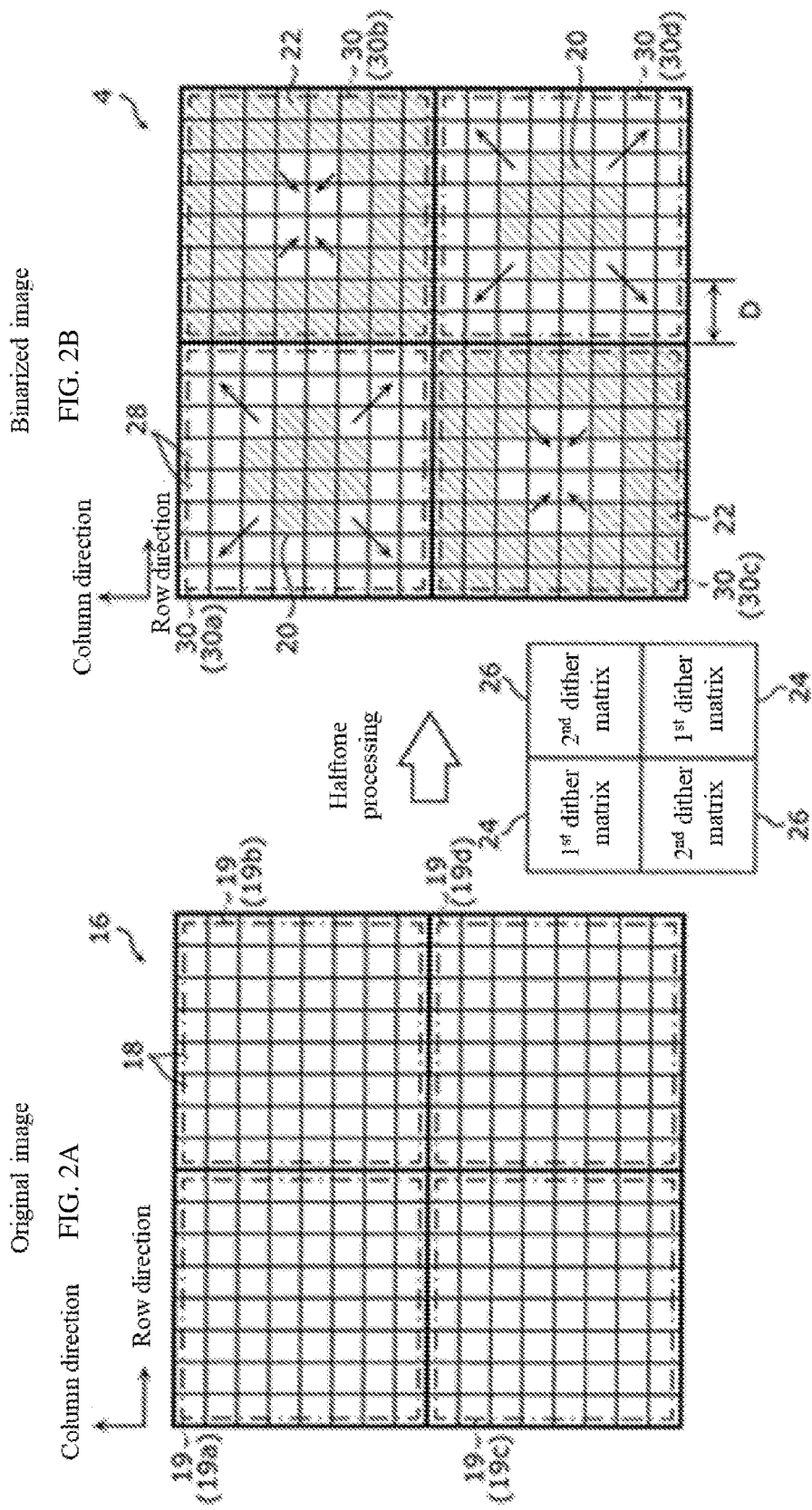

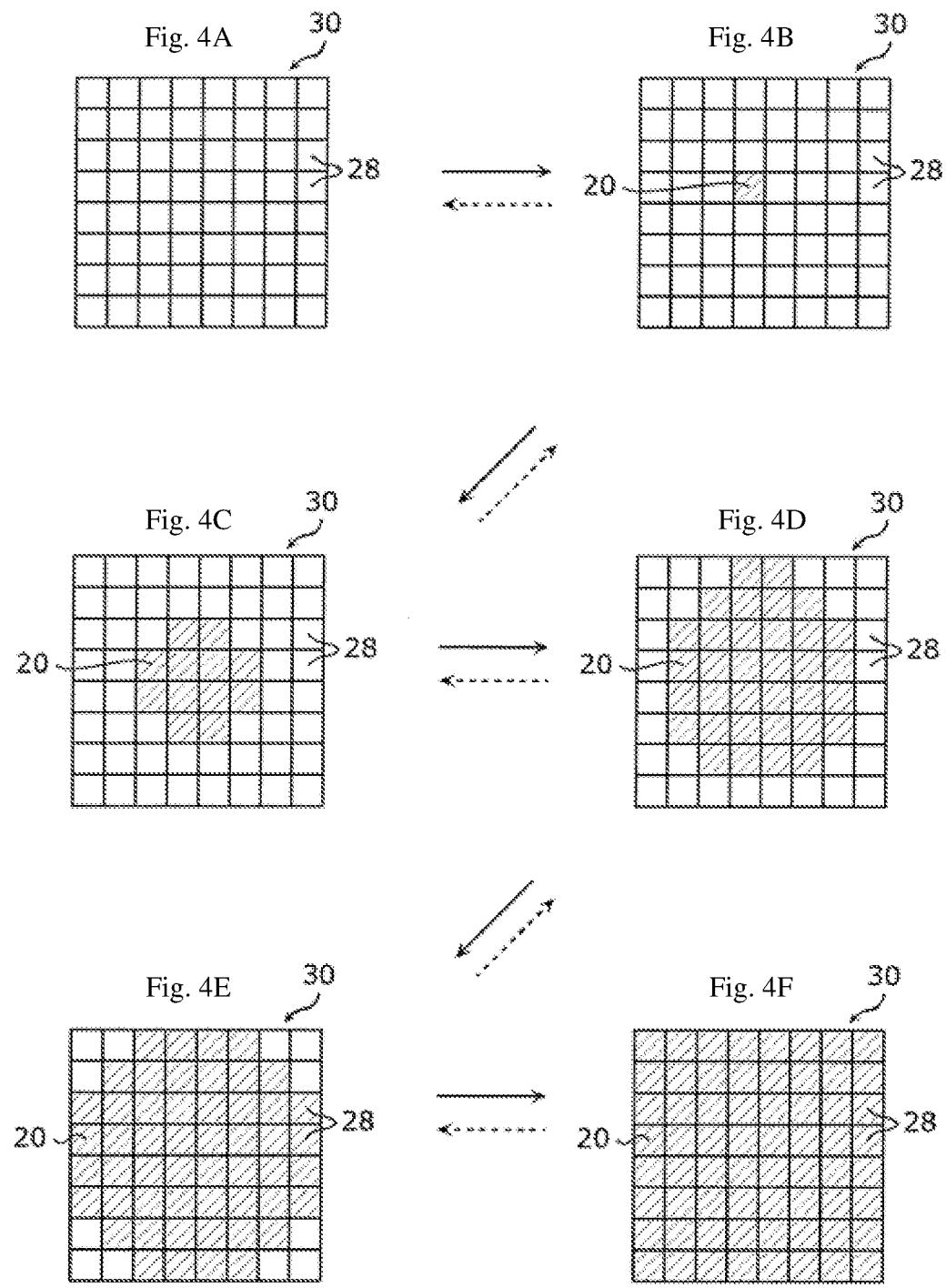

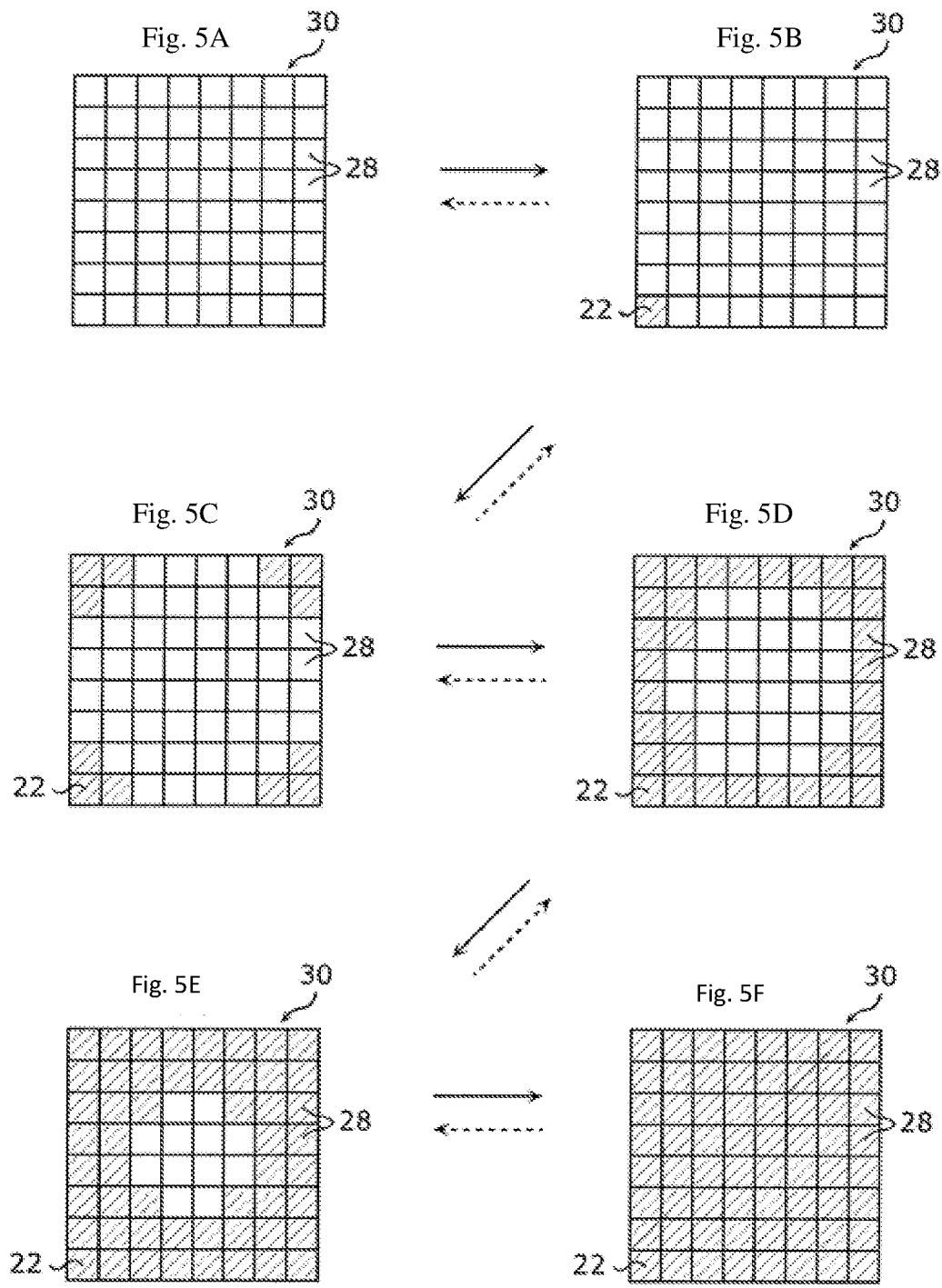

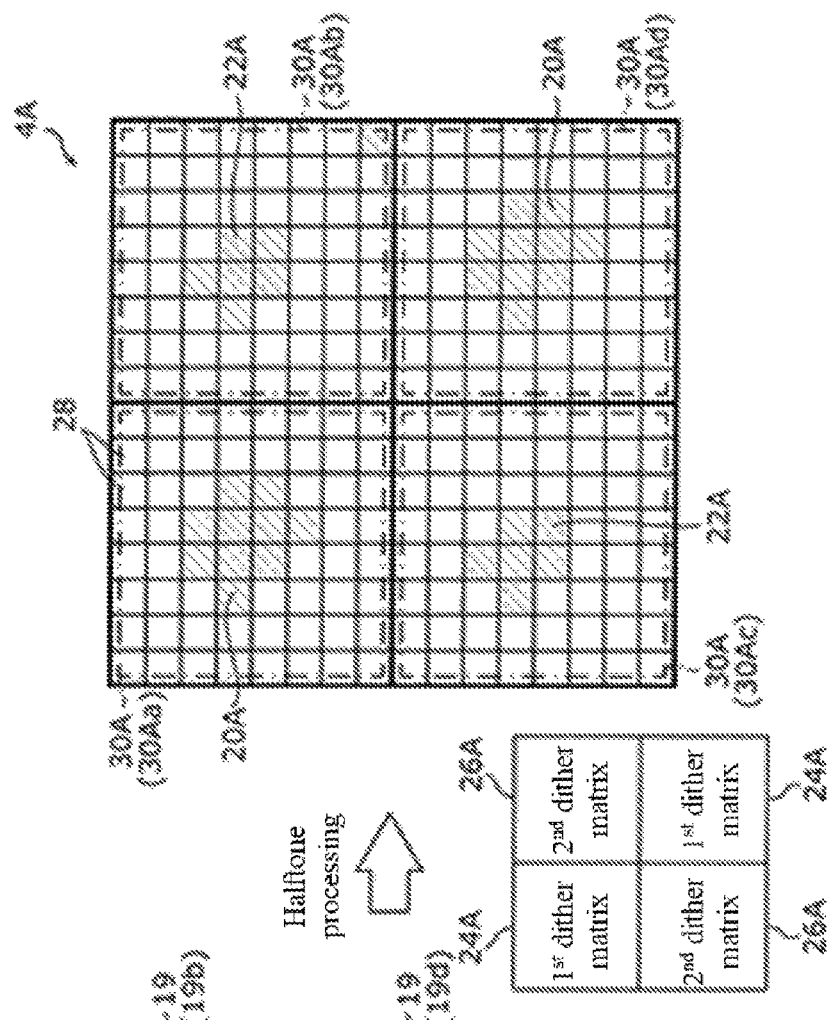
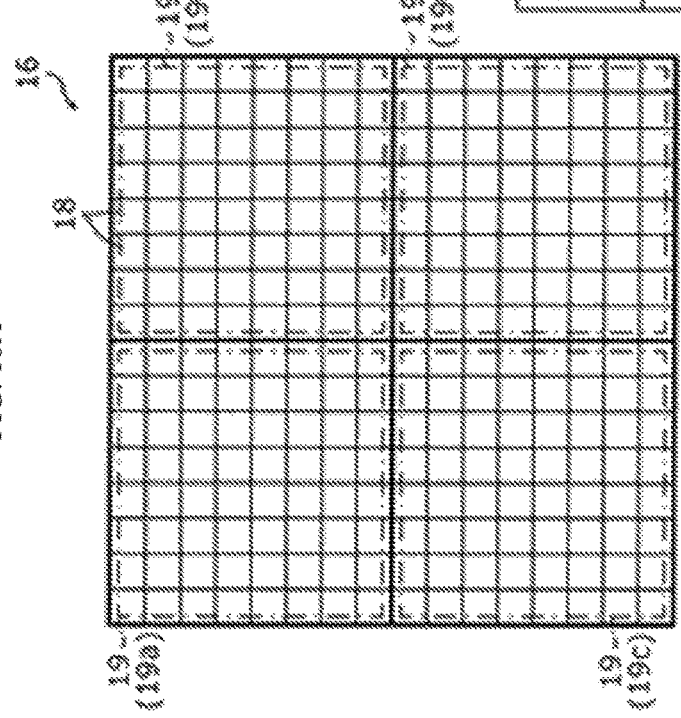
FIG. 10A Original image
FIG. 10B Binarized image

IMAGE PROCESSING APPARATUS AND METHOD FOR GENERATING A BINARY IMAGE WITH AREAS HAVING DIFFERENT RATIOS OF CHANGE IN GRADATION FORMED BY DIFFERENT DOT PATTERNS ALTERNATINGLY DISPOSED

BACKGROUND

Technical Field

The present invention generally relates to an image processing apparatus for generating a binarized image (also referred to as a binary image).

Related Art

As a means of expressing in a pseudo manner a continuous gradation in a printer, for example, halftone processing by a dither method is known. In this halftone processing by a dither method, by replacing each portion of a multi-gradation original image with a dot pattern having an area corresponding to a gradation value, a binarized image formed with a large number of halftone dots is generated (for example, see patent literature 1).

A dot pattern is a group of dots respectively formed in a plurality of cells disposed in a matrix in a binarized image and is also referred to as halftone dots. A dot is an image element having a gradation on a shadow side (for example, black) among two gradations (for example, white and black).

Because such halftone processing expresses in a pseudo manner a continuous gradation by changing the area of the dot pattern instead of changing a number of dot patterns, it is also referred to as AM (amplitude) modulation halftone processing.

In conventional halftone processing, each of a large number of dot patterns formed into a binarized image, in a situation where each gradation value of all image elements included in a predetermined region of an original image changes from a highlight side to a shadow side, grows in a period of certain steps from a center region toward a peripheral region of a cell.

Patent Literature 1: JP 2007-67984 A

However, in the conventional halftone processing described above, an image quality may degrade due to a gradation of the binarized image being unable to be expressed favorably.

SUMMARY

One or more embodiments of the present invention provide an image processing apparatus that, when converting a multi-gradation original image into a binarized image, can increase an image quality of the binarized image.

An image processing apparatus according to one or more embodiments of the present invention may comprise an acquisition unit that acquires an image and a generation unit that, based on a plurality of dither matrices, generates a binary image from the image. An area change rate differs for each of a plurality of dot patterns formed based on the plurality of dither matrices.

In an image processing apparatus according to one or more embodiments of the present invention, in a plurality of dot patterns, the change rates of the areas relative to a change in a gradation of an original image differ from each other. Therefore, the change in the gradation of the original image can be expressed by a combination of the plurality of dot patterns and the gradation of the original image can be expressed to high precision in the binary image.

For example, in an image processing apparatus according to one or more embodiments of the present invention, a plurality of dither matrices may include a first dither matrix and a second dither matrix and an area change rate of a plurality of first dot patterns formed based on the first dither matrix and an area change rate of a plurality of second dot patterns formed based on the second dither matrix may differ.

For example, in an image processing apparatus according to one or more embodiments of the present invention, in the binary image, a plurality of first dot patterns and a plurality of second dot patterns may be disposed alternatingly.

For example, in an image processing apparatus according to one or more embodiments of the present invention, in the binary image, disposition of a plurality of first dot patterns or a plurality of second dot patterns may be substantially 45 degrees apart.

For example, in an image processing apparatus according to one or more embodiments of the present invention, the binary image may include a first cell where the first dot pattern is formed and a second cell where the second dot pattern is formed and the first cell and the second cell may be disposed alternatingly in a row direction and a column direction in the binary image.

In an image processing apparatus according to one or more embodiments of the present invention, the first cell where the first dot pattern is formed and the second cell where the second dot pattern is formed can be disposed in a matrix, lined up alternatingly in the row direction and the column direction. Therefore, turbulence in the gradation of the binarized image due to uneven distribution of the first dot pattern and the second dot pattern can be prevented and the gradation of the original image can be expressed to higher precision in the binarized image.

For example, in an image processing apparatus according to one or more embodiments of the present invention, in the binary image, the first dot pattern may enlarge from a center region to a peripheral region of the first cell and the second dot pattern may enlarge from a peripheral region to a center region of the second cell.

In an image processing apparatus according to one or more embodiments of the present invention, adjacent dot patterns can be made into mutually-differing shapes and a perceived roughness arising from dot patterns of the same shape being disposed adjacent at the same distance in the binary image can be suppressed.

For example, in an image processing apparatus according to one or more embodiments of the present invention, ranges of an index value relating to a brightness of the image may include a first range where the index value is at or above a first predetermined value, a second range where the index value is at or below a second predetermined value less than the first predetermined value, and an intermediate range where the index value is between the first predetermined value and the second predetermined value and in a predetermined region included in the image, when the index value changes from the intermediate range to the second range, an increase rate of an area of the first dot pattern included in the binary image may be less than an increase rate of an area of the second dot pattern.

In an image processing apparatus according to one or more embodiments of the present invention, when an index value of the original image changes from the intermediate range to the second range on a shadow side, the area change rate of the first dot pattern can be kept lower than the area change rate of the second dot pattern. That is, on the shadow side, the gradation can be expressed at a high resolution using the first dot pattern.

For example, in an image processing apparatus according to one or more embodiments of the present invention, each area of the first dot pattern and the second dot pattern may increase monotonically as a gradation of the predetermined region changes from the first range to the second range.

In an image processing apparatus according to one or more embodiments of the present invention, as the gradation of each region of the original image changes from a highlight side (first range) to the shadow side (second range), the respective areas of the first dot pattern and the second dot pattern can be increased monotonically. Therefore, the area of the dot pattern changing unnaturally relative to the change in the gradation of the original image can be prevented and the gradation of the original image can be expressed to higher precision in the binary image.

For example, in an image processing apparatus according to one or more embodiments of the present invention, in a two-dimensional cartesian coordinate system defined by a horizontal axis indicating a gradation of each region of the image and a vertical axis indicating an area of a dot pattern, i) the area of the first dot pattern may be approximated by an upwardly-convex curve and ii) the area of the second dot pattern may be approximated by a downwardly-convex curve.

In an image processing apparatus according to one or more embodiments of the present invention, the area of the first dot pattern and the area of the second dot pattern can be approximated by the upwardly convex curve and the downwardly-convex curve. Therefore, the area of the dot pattern can be changed smoothly relative to the change in the gradation of the original image and the gradation of the original image can be expressed to higher precision in the binary image.

For example, in an image processing apparatus according to one or more embodiments of the present invention, an average or total of the gradation and the area of the first dot pattern and the area of the second dot pattern may be a proportional relationship.

For example, in an image processing apparatus according to one or more embodiments of the present invention, the generation unit may superimpose a noise component on the plurality of dither matrices.

In an image processing apparatus according to one or more embodiments of the present invention, the noise component can be superimposed on the plurality of matrices and the gradation of the original image can be expressed to higher precision in the binary image.

For example, in an image processing apparatus according to one or more embodiments of the present invention, the generation unit, for each region in the image, may superimpose a noise component according to this region on the plurality of dither matrices.

In an image processing apparatus according to one or more embodiments of the present invention, for each region, the noise component according to this region can be superimposed on the dither matrices. Therefore, dot-pattern types can be increased and the gradation of the original image can be expressed to higher precision in the binarized image.

For example, in an image processing apparatus according to one or more embodiments of the present invention, the noise component may be a uniform random number. Moreover, the noise component may be a normal random number.

In an image processing apparatus according to one or more embodiments of the present invention, a uniform random number or a normal random number can be used as the noise component, the gradation of the original image can be expressed to higher precision in the binarized image, and the noise component can be readily superimposed on the dither matrix.

One or more embodiments of the present invention can not only be realized as an image processing apparatus including such characteristic processing units but also as an image processing method where the processes executed by the characteristic processing units included in the image processing apparatus are provided as steps. Moreover, it can also be realized as a program for causing a computer to function as the characteristic processing units included in the image processing apparatus or a program that causes a computer to execute the characteristic steps included in the image processing method. Moreover, it is needless to say that such a program can be distributed via a computer-readable, non-temporary recording medium such as a compact disc read-only memory (CD-ROM) or a communication network such as the internet.

According to one or more embodiments of the present invention, an image processing apparatus may comprise a scanner that acquires an image, and a processor that changes areas of a plurality of dot patterns in accordance with gradation values in the image using a plurality of dither matrices, and generates a binary image based on the plurality of dot patterns. A change rate of each of the areas may differ from each other.

According to one or more embodiments of the present invention, a method of generating a binarized image in an image processing apparatus may comprise acquiring, with a scanner of the image processing apparatus, an image, changing, with a processor of the image processing apparatus, areas of a plurality of dot patterns in accordance with gradation values in the image using a plurality of dither matrices at change rates of the areas, and generating, with the processor, a binary image based on the plurality of dot patterns. The change rates differ from each other.

An image processing apparatus according to one or more embodiments of the present invention can increase an image quality of the binarized image.

BRIEF DESCRIPTION OF DRAWINGS

FIGS. 2A-2B are diagrams illustrating an example of halftone processing by the printer according to the first embodiment of the present invention.

FIGS. 4A-4F are diagrams illustrating a first dot pattern according to the first embodiment of the present invention growing.

FIGS. 5A-5F are diagrams illustrating a second dot pattern according to the first embodiment of the present invention growing.

FIGS. 10A-10B are diagrams illustrating an example of halftone processing according to the printer according to the second embodiment of the present invention.

DETAILED DESCRIPTION

Embodiments of the present invention will be described in detail below with reference to the drawings. In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment (1-1. Functional Configuration of Printer)

Figure 1:
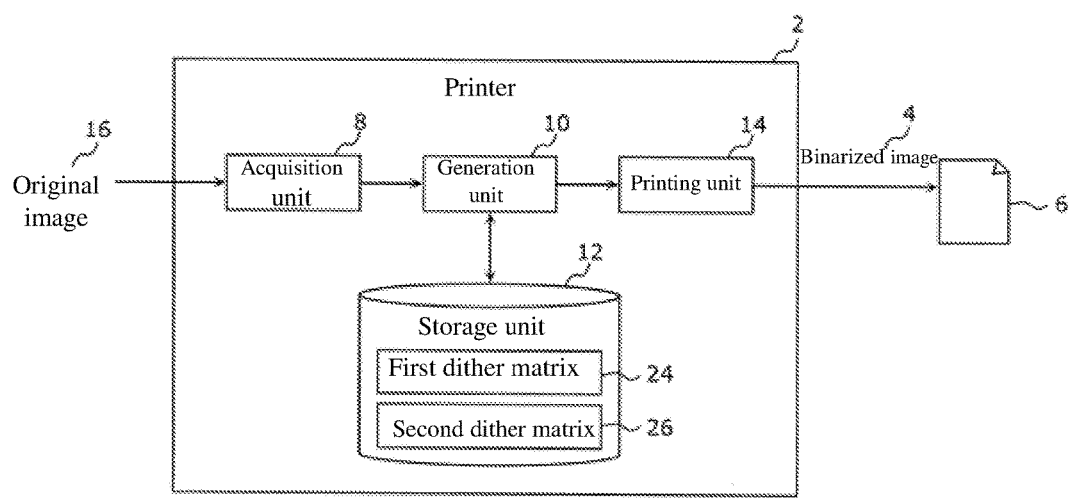
FIG. 1 is a block diagram illustrating a functional configuration of a printer according to a first embodiment of the present invention.
Figure 3A:
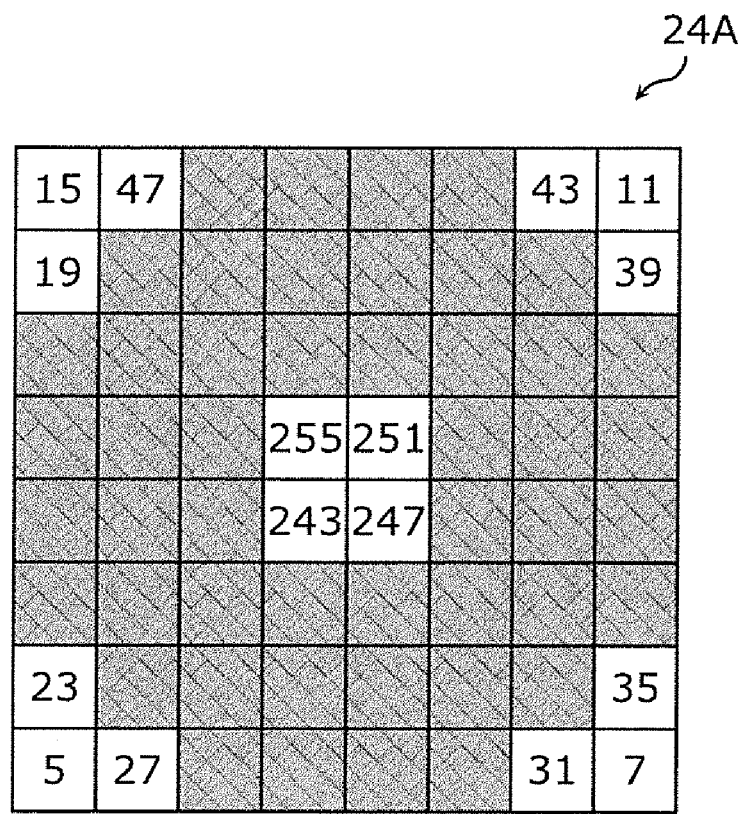
FIG. 3A is a diagram illustrating an example of a first dither matrix according to the first embodiment of the present invention.
Figure 3B:
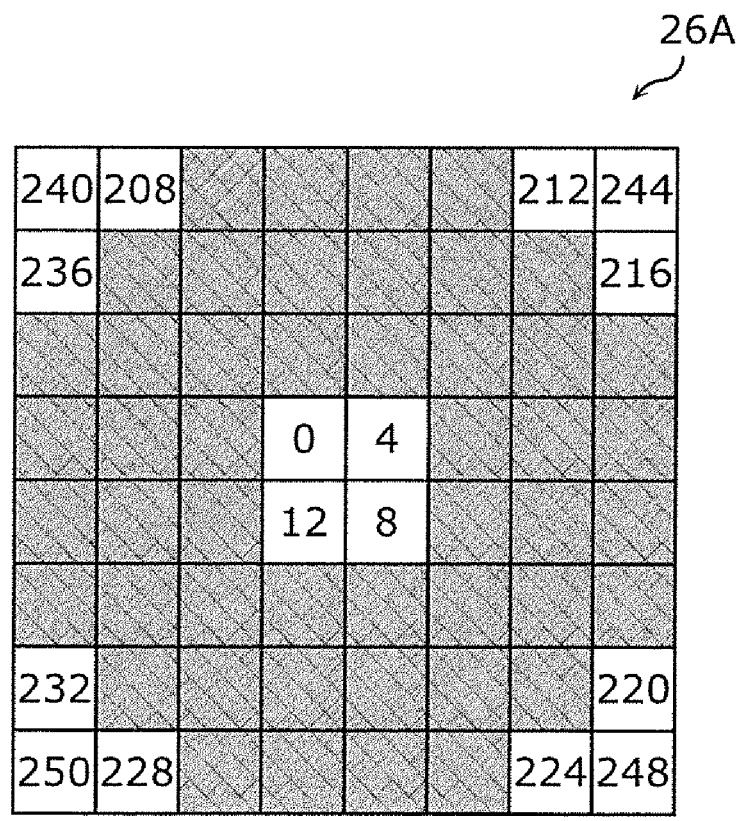
FIG. 3B is a diagram illustrating an example of a second dither matrix according to the first embodiment of the present invention.

First, with reference to FIG. 1 to FIG. 3B, a functional configuration of a printer 2 according to a first embodiment of the present invention will be described below. FIG. 1 is a block diagram illustrating the functional configuration of the printer 2 according to the first embodiment of the present invention. FIGS. 2A-2B are diagrams illustrating an example of halftone processing by the printer 2 according to the first embodiment of the present invention. FIG. 3A is a diagram illustrating an example of a first dither matrix 24. FIG. 3B is a diagram illustrating an example of a second dither matrix 26. In FIG. 3A and FIG. 3B, to conceal several thresholds, a region of a portion of the first dither matrix 24 and the second dither matrix 26 is applied with hatching.

The printer 2 according to the first embodiment of the present invention (an example of the image processing apparatus) is, for example, a printer for printing a binarized image 4 on a paper 6. As illustrated in FIG. 1, the printer 2 includes an acquisition unit 8 (scanner), a generation unit 10, a storage unit 12 (memory), and a printing unit 14. The printer 2 is communicably connected to an external terminal device (such as a personal computer; not illustrated). Moreover, the paper 6 is, for example, normal paper or the like. For example, the generation unit 10 and the printing unit 14 may be implemented by a processor of the printer.

The acquisition unit 8 acquires an original image 16 sent from, for example, the external terminal device. The original image 16 is a multi-gradation grayscale image having, for example, 8-bit gradation values ("0" to "255"). As illustrated in FIGS. 2A-2B, the original image 16 has a plurality of pixels 18 disposed in a matrix. In the example illustrated in FIG. 2A, the original image 16 includes a total of 256 pixels 18 having a pixel array of a 16×16 size. Each of this plurality of pixels 18 has a pixel value of any of "0" to "255." Here, a pixel 18 having the pixel value of "255" is a pixel having a gradation value farthest on a highlight side (that is, the gradation value of "255") and a pixel 18 having the pixel value of "0" is a pixel having a gradation value farthest on a shadow side (that is, the gradation value of "0"). This gradation value is an example of the index value relating to the brightness.

The generation unit 10 divides the original image 16 into a plurality of regions 19 (19a, 19b, 19c, 19d) and executes halftone processing for each region 19. Each of the plurality of regions 19 includes, for example, a total of sixty-four pixels 18 having a pixel array of an 8×8 size. The generation unit 10 executes halftone processing and, as a result, generates the binarized image 4, which has a plurality of dot patterns (first dot pattern 20 and second dot pattern 22) respectively including one or a plurality of pixels forming a dot. For example, the halftone processing is AM modulation halftone processing by a dither method using any among the first dither matrix 24 and the second dither matrix 26 (described below), which are stored in the storage unit 12.

As illustrated in FIG. 2B, the binarized image 4 is a halftone image having 1-bit gradation values and has a plurality of pixels 28 disposed in a matrix. In the example illustrated in FIG. 2B, the binarized image 4, like the original image 16, includes a total of 256 pixels 28 having a pixel array of a 16×16 size. Each of this plurality of pixels 28 has a pixel value of either "0" or "255" (binary).

Here, a pixel 28 having the pixel value of "255" is a white pixel where no dot is formed and a pixel 28 having the pixel value of "0" is a black pixel where a dot is formed.

Furthermore, in a situation of negative-positive inverted image applied with processing that inverts white and black in an image, the opposite of the above is also conceivable. However, even in a situation of binarizing a negative-positive inverted image, cells 30 merely switching places left and right enables generation of a substantially identical image; therefore, there is no need to consider this situation in one or more embodiments of the present invention.

Furthermore, two-dimensionally disposed on the binarized image 4 is a plurality of cells 30 including cells 30a, 30d (first cell) having the first dot pattern 20 generated using the first dither matrix 24 and cells 30b, 30c (second cell) having the second dot pattern 22 generated using the second dither matrix 26. Each of the plurality of cells 30 corresponds to the plurality of regions 19 of the original image 16. That is, in the example illustrated in FIGS. 2A-2B, the cells 30a, 30b, 30c, 30d respectively correspond to the regions 19a, 19b, 19c, 19d. Moreover, the plurality of cells 30 is disposed in a matrix of two rows and two columns and each cell 30 includes, for example, a total of sixty-four pixels 28 having a pixel array of an 8×8 size. As described below, the first dot pattern 20 and the second dot pattern 22, in a situation where each gradation value of all pixels 18 included in the region 19 of the original image 16 changes from the highlight side to the shadow side, grow in mutually differing aspects. A generation method of the first dot pattern 20 and the second dot pattern 22 is described in detail below.

The storage unit 12 is a memory for storing the first dither matrix 24 and the second dither matrix 26. As illustrated in FIG. 3A, the first dither matrix 24 is a dither matrix of, for example, an 8×8 size for converting a region of a multi-gradation original image into the first cell having the first dot pattern 20. Meanwhile, as illustrated in FIG. 3B, the second dither matrix 26 is a dither matrix of, for example, an 8×8 size for converting a region of a multi-gradation original image into the second cell having the second dot pattern 22. The first dither matrix 24 and the second dither matrix 26 are described in detail below.

The printing unit 14 prints the binarized image 4 generated by the generation unit 10 on the paper 6. The printing unit 14, by fixing a black toner or a black ink on the paper 6, forms a large number of the first dot patterns 20 and the second dot patterns 22 on the paper 6. By the large number of first dot patterns 20 and the second dot patterns 22 being formed on the paper 6 in this manner, the binarized image 4 is printed on the paper 6.

(1-2. Generation Method of First Dot Pattern and Second Dot Pattern)

Here, the generation method of the first dot pattern 20 and the second dot pattern 22 by the generation unit 10 is described with reference to FIGS. 2A-2B.

The generation unit 10, when executing halftone processing on the original image 16, alternatingly uses the first dither matrix 24 and the second dither matrix 26 in a row direction (horizontal direction in FIGS. 2A-2B) and a column direction (vertical direction in FIGS. 2A-2B) of the original image 16.

Specifically, the generation unit 10 compares each pixel value of the total of sixty-four pixels 18 having the pixel array of the 8×8 size included in the region 19a, which is in the upper left of the original image 16 illustrated in FIG. 2A, and a first threshold corresponding to this pixel 18 included in the first dither matrix 24. For example, the generation unit 10 compares a pixel value of a pixel in the upper-left corner of the region 19a in FIG. 2A and a first threshold "15" in the upper-left corner of the first dither matrix in FIG. 3A. By this comparison, in a situation where the pixel value of the pixel 18 of the original image 16 is at or above the first threshold corresponding to the first dither matrix 24, the generation unit 10 converts this pixel value into "255" and in a situation where the pixel value of the pixel 18 of the original image 16 is less than the first threshold corresponding to the first dither matrix 24, the generation unit 10 converts this pixel value into "0." That is, by halftone processing using the first dither matrix 24, the pixel value of the pixel 18 included in the original image 16 is binarized into any among "255" and "0." By this, in the cell 30a, which is in the upper left of the binarized image 4 illustrated in FIG. 2B, the first dot pattern 20 having an area corresponding to the gradation values of the region 19a in the upper left of the original image 16 is formed.

Similarly, the generation unit 10, when executing halftone processing on the original image 16, compares each pixel value of the total of sixty-four pixels 18 having the pixel array of the 8×8 size included in the region 19b, which is in the upper right of the original image 16 illustrated in FIG. 2A, and a second threshold corresponding to this pixel 18 included in the second dither matrix 26. By this comparison, in a situation where a pixel value of the pixel 18 of the original image 16 is greater than the second threshold corresponding to the second dither matrix 26, the generation unit 10 converts this pixel value into "255" and in a situation where a pixel value of the pixel 18 of the original image 16 is at or below the second threshold corresponding to the second dither matrix 26, the generation unit 10 converts this pixel value into "0." That is, by halftone processing using the second dither matrix 26, the pixel value of the pixel 18 included in the original image 16 is binarized into any among "255" and "0." By this, in the cell 30b, which is in the upper right of the binarized image 4 illustrated in FIG. 2B, the second dot pattern 22 having an area corresponding to the gradation values of the region 19b in the upper right of the original image 16 is formed.

Similarly, the generation unit 10, when executing halftone processing on the original image 16, compares each pixel value of the total of sixty-four pixels 18 having the pixel array of the 8×8 size included in the region 19c, which is in the lower left of the original image 16 illustrated in FIG. 2A, and the second threshold corresponding to this pixel 18 included in the second dither matrix 26. By this, in the cell 30c, which is in the lower left of the binarized image 4 illustrated in FIG. 2B, the second dot pattern 22 having the area corresponding to the gradation values of the region 19c in the lower left of the original image 16 is formed.

Similarly, the generation unit 10, when executing halftone processing on the original image 16, compares each pixel value of the total of sixty-four pixels 18 having the pixel array of the 8×8 size included in the region 19d, which is in the lower right of the original image 16 illustrated in FIG. 2A, and the first threshold corresponding to this pixel 18 included in the first dither matrix 24. By this, in the cell 30d, which is in the lower right of the binarized image 4 illustrated in FIG. 2B, the first dot pattern 20 having the area corresponding to the gradation values of the region 19d in the lower right of the original image 16 is formed.

As illustrated in FIG. 2B, the first dot pattern 20 and the second dot pattern 22, by the halftone processing described above, come to be disposed lined up alternatingly in a row direction (horizontal direction in FIGS. 2A-2B) of the plurality of cells 30 and disposed lined up in a plurality alternatingly in a column direction (vertical direction in FIGS. 2A-2B) of the plurality of cells 30. Moreover, as illustrated in FIGS. 2A-2B, a pair of adjacent first dot patterns 20 is disposed lined up in a direction tilted 45 degrees respectively from the row direction and the column direction of the plurality of cells 30. Similarly, a pair of adjacent second dot patterns 22 is disposed lined up in a direction tilted 45 degrees respectively from the row direction and the column direction of the plurality of cells 30. Moreover, as illustrated in FIG. 2B, the four cells 30a, 30b, 30c, and 30d are disposed in point symmetry.

(1-3. First Dither Matrix and Second Dither Matrix)

Next, the first dither matrix 24 and the second dither matrix 26 are described with reference to FIG. 3A to FIG. 5F. FIGS. 4A-4F are diagrams illustrating the first dot pattern 20 according to the first embodiment of the present invention growing. FIGS. 5A-5F are diagrams illustrating the second dot pattern 22 according to the first embodiment of the present invention growing.

As illustrated in FIG. 3A and FIG. 3B, the first dither matrix 24 and the second dither matrix 26 respectively have a plurality of first thresholds and a plurality of second thresholds. Moreover, the first dither matrix 24 and the second dither matrix 26 have threshold dispositions that mutually differ.

Specifically, as illustrated in FIGS. 4A-4F, the first dither matrix 24 has a threshold disposition where the first dot pattern 20 grows in a certain period from an inner side toward an outer side of the cell 30 in a situation where a brightness of each gradation value of all pixels 18 included in the region 19 of the original image 16 changes from being farthest on the highlight side (see FIG. 4A) to being farthest on the shadow side (see FIG. 4F). That is, when the gradation values in each region 19 of the original image 16 change from the highlight side to the shadow side, the first dot pattern 20 enlarges from a center region to a peripheral region of the first cell (here, the cells 30a, 30d). At this time, in the first dither matrix 24, a first threshold disposed in the center region has a value more on the highlight side than a first threshold disposed in the peripheral region.

In the present specification, "the first dot pattern 20 growing" refers to the area of the first dot pattern 20 being formed so as to incrementally change from an area of zero pixels 28 (see FIG. 4A) to an area of sixty-four pixels 28 (see FIG. 4F). As illustrated in FIGS. 4C-4E, a shape of the first dot pattern 20 is substantially circular.

Meanwhile, as illustrated in FIGS. 5A-5F, the second dither matrix 26 has a threshold disposition where the second dot pattern 22 grows in a certain period from the outer side toward the inner side of the cell 30 in a situation where each gradation value of all pixels 18 included in the region 19 of the original image 16 is changed from being farthest on the highlight side (FIG. 5A) to being farthest on the shadow side (see FIG. 5F). That is, when the gradation values in each region 19 of the original image 16 change from the highlight side to the shadow side, the second dot pattern 22 enlarges from a peripheral region to a center region of the second cell (here, the cells 30b, 30c). At this time, in the second dither matrix 26, a second threshold disposed in the center region has a value more on the shadow side than a second threshold disposed in the peripheral region.

In the present specification, "the second dot pattern 20 growing" refers to the area of the second dot pattern 22 incrementally changing from an area of zero pixels 28 (see FIG. 5A) to an area of sixty-four pixels 28 (see FIG. 5F). As illustrated in FIG. 5C-5E, a shape of a region where the second dot pattern 22 is not formed is substantially circular.

(1-4. Flow of Processing by Printer)

Figure 6A:
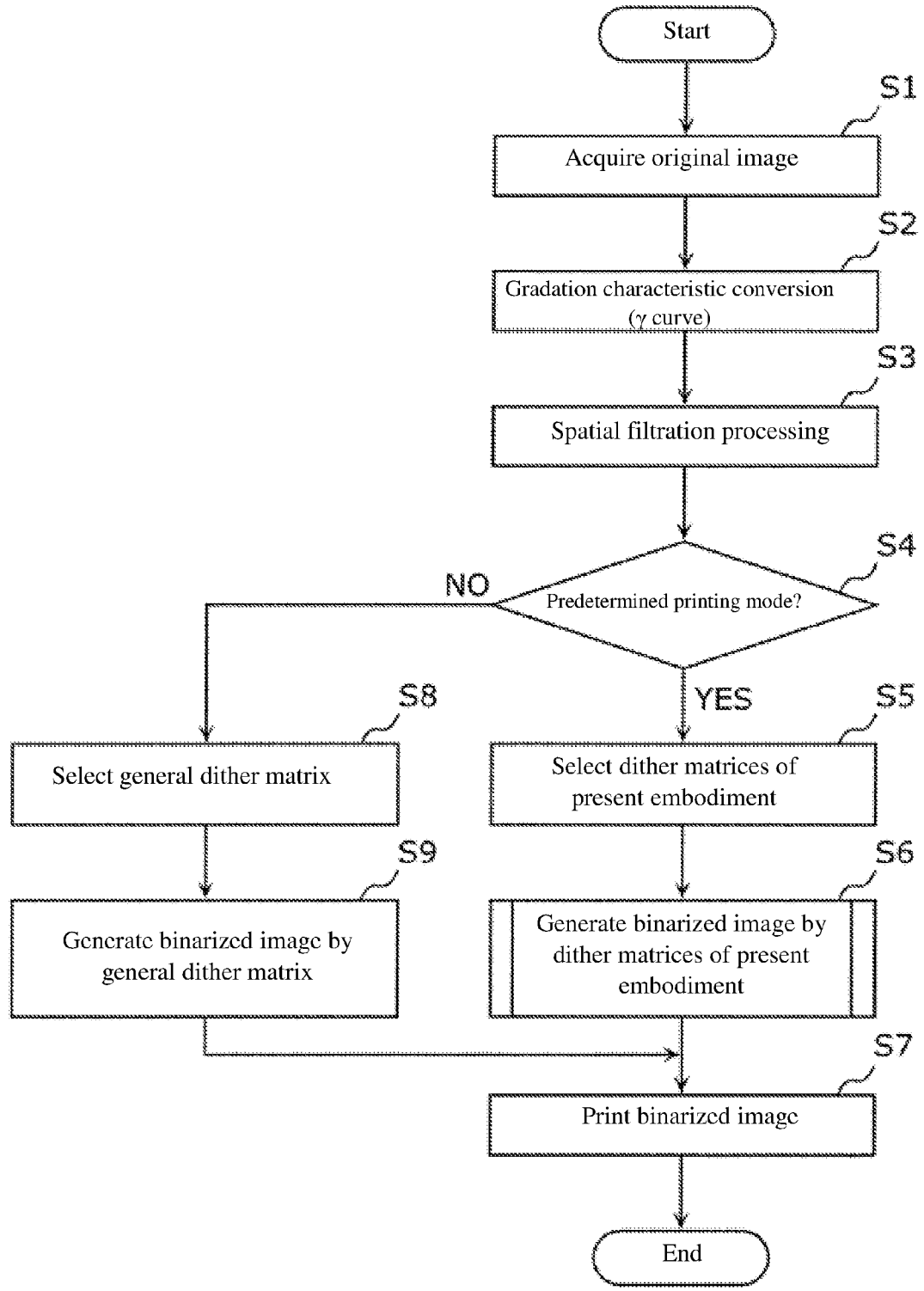
FIG. 6A is a flowchart illustrating a flow of processing by the printer according to the first embodiment of the present invention.

Next, a flow of processing (image processing method) by the printer 2 according to the first embodiment of the present invention is described with reference to FIG. 6A and FIG. 6B. FIG. 6A is a flowchart illustrating the flow of processing by the printer 2 according to the first embodiment of the present invention.

As illustrated in FIG. 6A, first, the acquisition unit 8 acquires the original image 16 sent from, for example, the external terminal device (S1). Afterward, the generation unit 10 executes gradient characteristic conversion ($\gamma$ curve) (S2) and spatial filtration processing (S3) on the original image 16 in this order. Afterward, in a situation where a printing mode is a predetermined printing mode (that is, a printing mode of using the dither matrices of one or more embodiments of the present invention) (YES at S4), the dither matrices in one or more embodiments of the present invention are selected (S5). Specifically, both the first dither matrix 24 and the second dither matrix 26 are selected. Afterward, the generation unit 10, by executing halftone processing on the original image 16 using the dither matrices in one or more embodiments of the present invention, generates the binarized image 4 from the original image 16 (S6). Afterward, the printing unit 14 prints the binarized image 4 generated by the generation unit 10 on the paper 6 (S7).

Returning to description of step S4, in a situation where the printing mode is not the predetermined printing mode (NO at S4), a general dither matrix is selected (S8). A general dither matrix is one type of dither matrix. For example, only one from among the first dither matrix 24 and the second dither matrix 26 is selected. Afterward, the generation unit 10, by executing halftone processing on the original image 16 using the general dither matrix, generates a binarized image from the original image 16 (S9). Then, step S7 is executed similarly to the above.

Here, details of the halftone processing at step S6 are described with reference to FIG. 6B. FIG. 6B is a flowchart illustrating the details of halftone processing by the printer 2 according to the first embodiment of the present invention. In FIG. 6B, Ix and Iy represent a size of the original image, respectively representing a pixel count in the row direction (horizontal direction) and the column direction (vertical direction) of the original image. Dx and Dy represent a size of the dither matrix, respectively representing a pixel count in a row direction and a column direction of the dither matrix (the first dither matrix and the second dither matrix). i and j represent a position in the row direction and the column direction of a target pixel. Here, i and j are 0 or integers greater than 0. Dpx and Dpy represent a reference position in the row direction and the column direction of the dither matrix. % is an operator representing the modulo operation and may also be denoted as "mod."

First, the generation unit 10 acquires the original image size (Ix, Iy) (S61). Moreover, the generation unit 10 acquires the dither matrix size (Dx, Dy) (S62). Next, the position of the target pixel (i, j) is initialized (S63). The target pixel is a pixel to be processed and is also referred to as a current pixel.

Next, the generation unit 10 determines whether j is less than Iy (S64). That is, the generation unit 10 determines whether a position in the vertical direction of the target pixel is in the original image. By this branch processing, loop processing in the vertical direction of the original image is performed.

Here, in a situation where j is equal to or greater than Iy (NO at S64), processing is ended.

Meanwhile, in a situation where j is less than Iy (YES at S64), the generation unit 10 determines whether i is less than Ix (S65). That is, the generation unit 10 determines whether a position in the horizontal direction of the target pixel is in the original image. By this branch processing, loop processing in the horizontal direction of the original image is performed.

Here, in a situation where i is equal to or greater than Ix (NO at S65), i is initialized to 0, j is incremented by 1 (S69), and the flow returns to step S64.

Meanwhile, in a situation where i is less than Ix (YES at S65), the generation unit 10 selects one dither matrix from among the plurality of dither matrices (S66). For example, the generation unit 10 calculates a remainder according to a type number DN of the dither matrix of a sum of an integer portion that is a result of dividing i by Dx (int(i/Dx)) and an integer portion that is a result of dividing j by Dy (int(j/Dy)) ({int(i/Dx)+int(j/Dy)} % DN) and selects a dither matrix based on a calculation result. For example, if (Dx, Dy)=(8, 8), (i, j)=(25, 30), and DN=2, the generation unit 10 selects a dither matrix identified by 0 (=(3+3) % 2) (for example, the first dither matrix 24). Moreover, for example, if (Dx, Dy)=(8, 8), (i, j)=(25, 33), and DN=2, the generation unit selects a dither matrix identified by 1 (=(3+4) % 2) (for example, the second dither matrix 26).

The generation unit 10 calculates the reference position of the selected dither matrix (S67). Specifically, the generation unit 10 calculates a remainder of i according to Dx as the reference position Dpx in the horizontal direction (Dpx=i % Dx). Moreover, the generation unit 10 calculates a remainder of j according to Dy as the reference position Dpy in the vertical direction (Dpy=j % Dy).

For example, if (Dx, Dy)=(8, 8) and (i, j)=(25, 30), the generation unit 10 calculates so Dpx=1 (=25% 8) and Dpy=6 (=30% 8).

Next, the generation unit 10 performs binarization processing of the target pixel (S68). Specifically, values of the target pixel (i, j) are compared with values of a reference pixel (Dpx, Dpy) of the selected dither matrix and the values of the target pixel are binarized according to a comparison result.

Next, i is incremented by 1 (S69) and the flow returns to step S65.

By the above, for each pixel in the original image 16, halftone processing is performed using the first dither matrix 24 or the second dither matrix 26 and the binarized image 4 is generated.

Figure 7A:
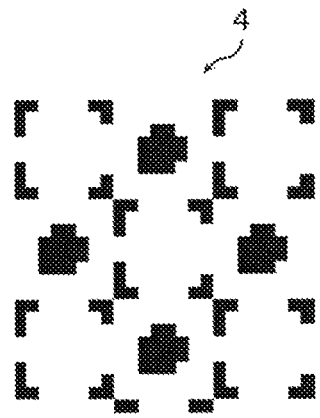
FIG. 7A is a diagram illustrating an example of a binarized image generated by executing halftone processing according to the first embodiment of the present invention on a uniformly-light-gray original image having a gradation value of "200."

Here, a specific example of the binarized image 4 generated by halftone processing according to the first embodiment of the present invention is illustrate. FIG. 7A is a diagram illustrating an example of the binarized image 4 generated by executing halftone processing according to the first embodiment of the present invention on a uniformly-light-gray original image 16 having a gradation value of "200." FIG. 7B is a diagram illustrating an example of the binarized image 4 generated by executing halftone processing according to the first embodiment of the present invention on a uniformly-darker-gray original image 16 having a gradation value of "100." FIG. 7C is a diagram illustrating an example of the binarized image 4 generated by executing halftone processing according to the first embodiment of the present invention on a uniformly-dark-gray original image 16 having a gradation value of "72." FIG. 7D is a diagram illustrating an example of the binarized image 4 generated by executing halftone processing according to the first embodiment of the present invention on an original image 16 of a gradation pattern where a gradation value changes continuously from "0" to "255."

Figure 7B:
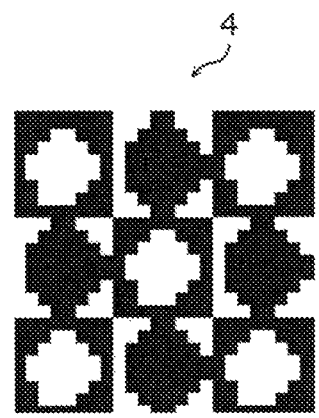
FIG. 7B is a diagram illustrating an example of a binarized image generated by executing halftone processing according to the first embodiment of the present invention on a uniformly-darker-gray original image having a gradation value of "100."
Figure 7C:
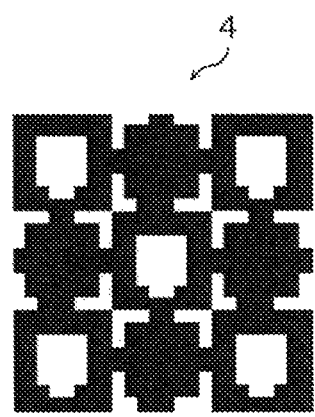
FIG. 7C is a diagram illustrating an example of a binarized image generated by executing halftone processing according to the first embodiment of the present invention on a uniformly-dark-gray original image having a gradation value of "72."
Figure 7D:
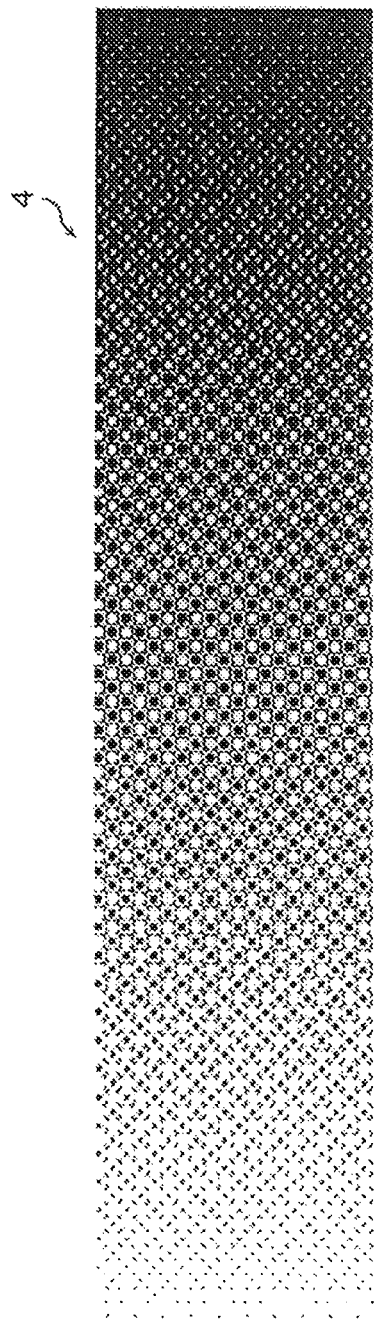
FIG. 7D is a diagram illustrating an example of a binarized image generated by executing halftone processing according to the first embodiment of the present invention on an original image of a gradation pattern where a gradation value changes continuously from "0" to "255."

With the binarized images 4 illustrated respectively in FIG. 7A to FIG. 7C, cells of different types are disposed adjacent in the row direction and the column direction and cells of the same type are disposed in directions respectively tilted 45 degrees from the row direction and the column direction. Moreover, with the dispositions illustrated in FIG. 7A to FIG. 7B, the plurality of cells is disposed in point symmetry. Moreover, in FIG. 7A to FIG. 7C, the plurality of cells has the same size and consists of the same number of pixels. The plurality of cells includes the first cell, where a density of a black image element (dot) is comparatively higher in the center region than the peripheral region, and the second cell, where the density of the black image element is comparatively higher in the peripheral region than the center region. The first cell and the second cell are disposed alternatingly adjacent in the row direction and the column direction in the binarized image 4. That is, the first cell and the second cell are disposed in a matrix, lined up alternatingly in the row direction and the column direction in the binarized image 4.

As clear from FIG. 7A to FIG. 7D, in the binarized image 4, in a situation where each gradation value of all pixels 18 included in the region 19 of the original image 16 is changed from the highlight side to the shadow side, a large number of dot patterns of two types (the first dot pattern 20 and the second dot pattern 22) that grow in mutually-differing aspects are formed.

In the first embodiment of the present invention, one or more of the following effects may be obtained. It is found that as a distance between the dot patterns in the binarized image 4 increases, a perceived roughness arising in the binarized image 4 increases. The perceived roughness arising in the binarized image 4 increases because, as in the conventional halftone processing, in a situation where each of a large number of dot patterns grows in a period of certain steps from the center region to the peripheral region of the cell 30, the distance between the dot patterns in the binarized image 4 becomes comparatively large.

In contrast, as described above, in the printer 2 according to the first embodiment of the present invention, formed in the binarized image 4 are the first dot pattern 20 and the second dot pattern 22 that grow in mutually-different aspects. By this, as illustrated in FIGS. 2A-2B, a distance D between adjacent dot patterns in the binarized image 4 can be changed. As a result, the perceived roughness arising in the binarized image 4 can be suppressed and an image quality of the binarized image 4 can be increased.

Furthermore, as illustrated in FIGS. 2A-2B, because the first dot pattern 20 and the second dot pattern 22 of different shapes are disposed alternatingly in the row direction and the column direction of the plurality of cells 30, jitter noise arising due to hardware can be reduced. "Jitter noise" refers to a horizontal stripe pattern appearing in an image.

Modified Example of First Embodiment

Figure 6B:
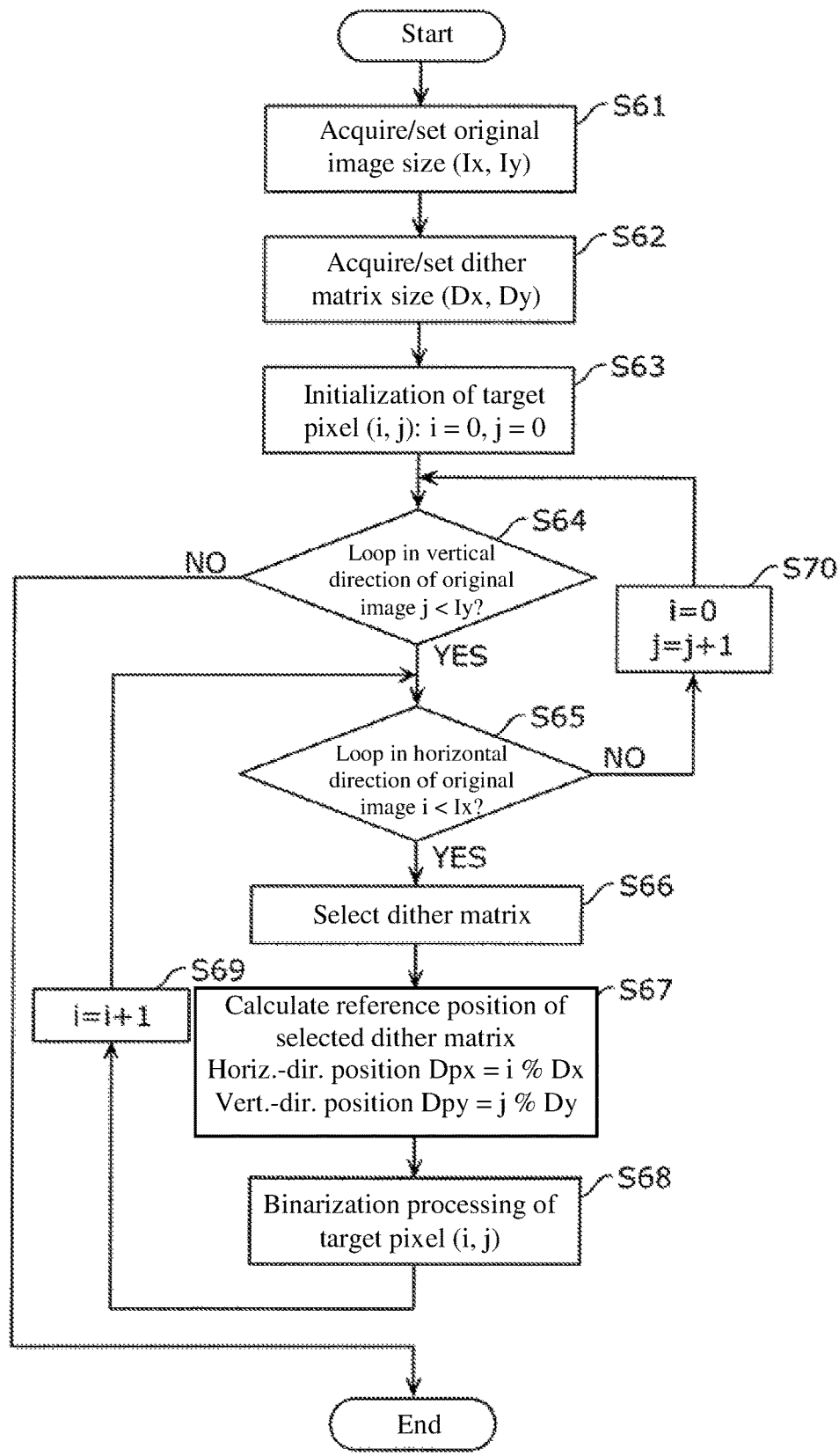
FIG. 6B is a flowchart illustrating details of halftone processing by the printer according to the first embodiment of the present invention.

The halftone processing in the first embodiment of the present invention is an example and is not limited to the processing in FIG. 6B. In the present modified example, another example of halftone processing is described. The present modified example is described below around points that differ from the first embodiment of the present invention.

Figure 8A:
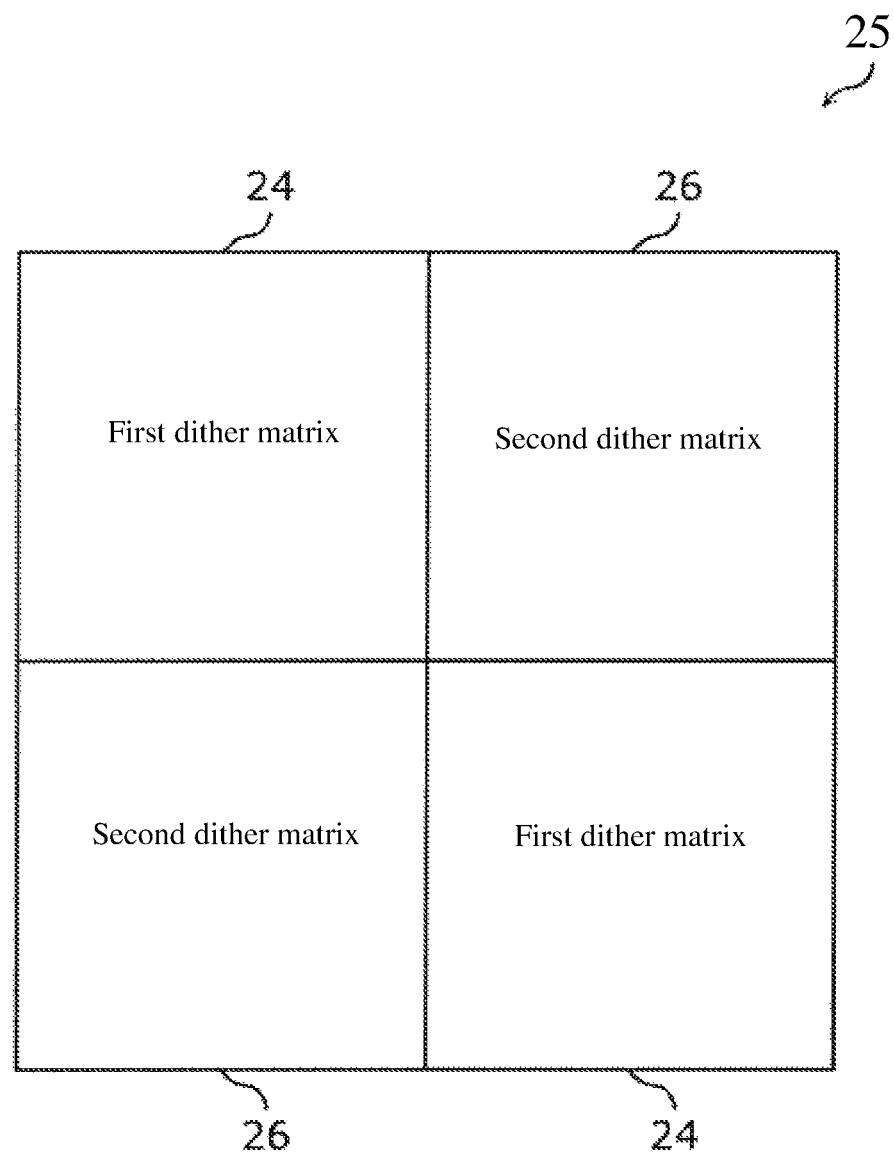
FIG. 8A is a diagram illustrating an integrated dither matrix according to a modified example of the first embodiment of the present invention.

In the present modified example, an integrated dither matrix obtained by integrating a plurality of dither matrices is used in halftone processing. FIG. 8A is a diagram illustrating an integrated dither matrix 25 in the modified example of the first embodiment of the present invention. The integrated dither matrix 25 has, for example, the first dither matrix 24 and the second dither matrix 26 disposed alternatingly. Specifically, the integrated dither matrix 25 is configured by four dither matrices (two first dither matrices 24 and two second dither matrices 26).

Figure 8B:
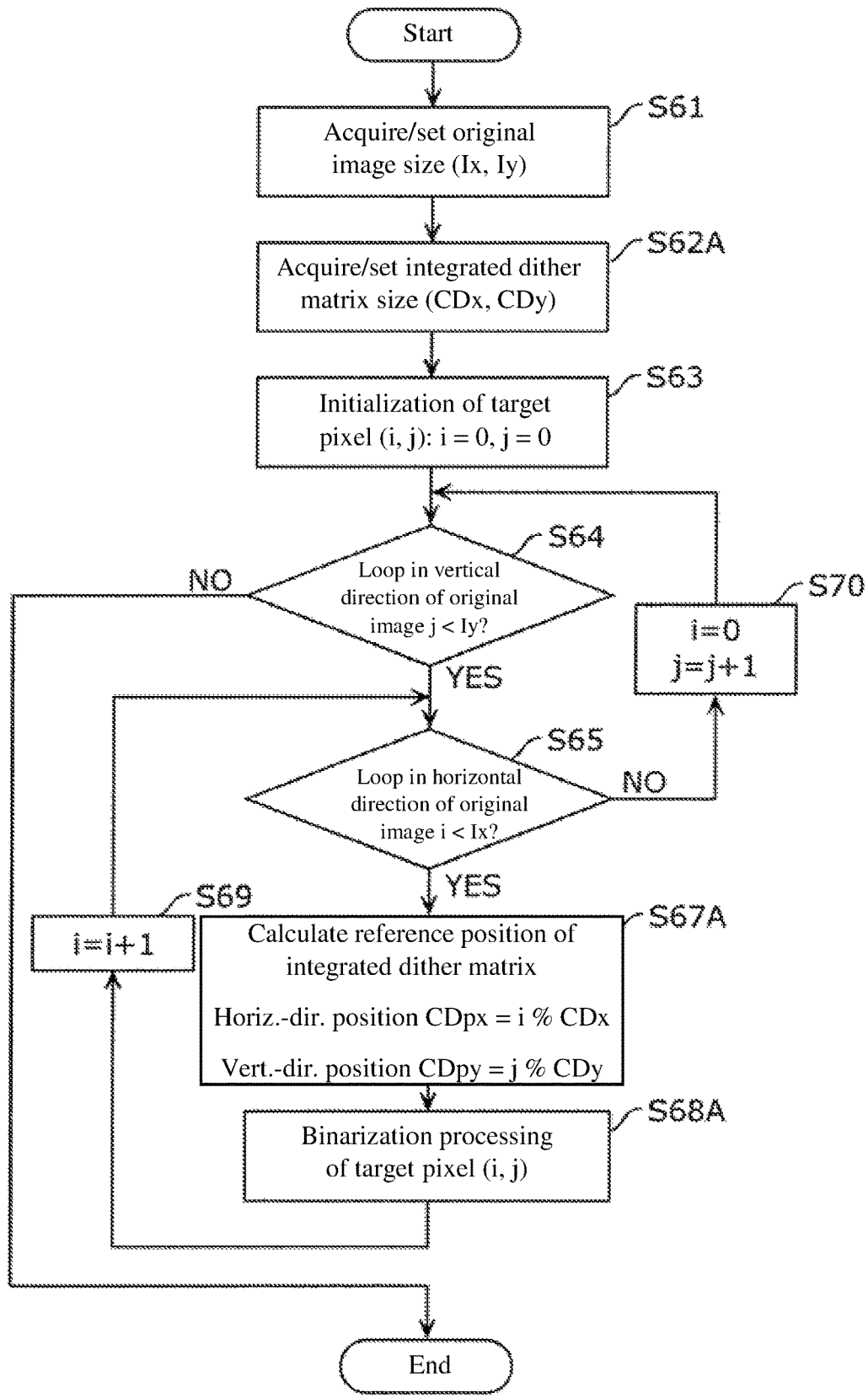
FIG. 8B is a flowchart illustrating details of halftone processing by a printer according to the modified example of the first embodiment of the present invention.

Next, details of halftone processing using the integrated dither matrix are described. FIG. 8B is a flowchart illustrating details of halftone processing by the printer 2 according to the modified example of the first embodiment of the present invention. Specifically, FIG. 8B illustrates details of the halftone processing at step S6 in FIG. 6A. Here, CDx and CDy represent a size of the integrated dither matrix and CDpx and CDpy represent a reference position in a row direction and a column direction of the integrated dither matrix. In FIG. 8B, steps identical or similar to FIG. 6B are labeled with the same reference signs and description is omitted as appropriate.

First, the generation unit 10 acquires the integrated dither matrix size (CDx, CDy) (S62A). For example, in a situation where the integrated dither matrix includes two first dither matrices 24 and two second dither matrices 26, (CDx, CDy)=(16, 16) is acquired.

Afterward, step S63 to step S65 are executed; in a situation where at step S65 i is less than Ix (YES at S65), the generation unit 10 calculates the reference position of the integrated dither matrix (S67A). Specifically, the generation unit 10 calculates a remainder of i according to CDx as the reference position CDpx in the horizontal direction (CDpx=i % CDx). Moreover, the generation unit 10 calculates a remainder of j according to CDy as the reference position CDpy in the vertical direction (CDpy=j % CDy).

For example, if (CDx, CDy)=(16, 16) and (i, j)=(25, 30), the generation unit 10 calculates so CDpx=9 (=25% 16) and CDpy=14 (=30% 16).

Next, the generation unit 10 performs binarization processing of the target pixel (S68A). Specifically, the values of the target pixel (i, j) are compared with values of a reference pixel (CDpx, CDpy) of the integrated dither matrix and the values of the target pixel are binarized according to a comparison result.

By the above, for each of the plurality of regions in the original image 16, halftone processing is performed using either the first dither matrix 24 or the second dither matrix 26 and the binarized image 4 is generated.

As above, according to the printer 2 according to the present modified example, by using the integrated dither matrix, when executing halftone processing by using any of the plurality of dither matrices, selecting the dither matrix can be omitted. As a result, a processing load of halftone processing can be mitigated and a processing speed can be improved.

The integrated dither matrix 25 illustrated in FIG. 8A is an example and the present invention is not limited thereto. For example, a total number of first dither matrices 24 and second dither matrices 26 included in the integrated dither matrix 25 may be greater than 4. For example, if the size of the integrated dither matrix is greater than a size of an input image, because the reference position of the integrated dither matrix (CDpx, CDpy) matches the position of the target pixel (i, j), the remainder calculation at step S67A can also be omitted.

Second Embodiment

Next, a second embodiment of the present invention will be described below. The second embodiment of the present invention differs from the first embodiment of the present invention in that a change rate of the area of the first dot pattern relative to a change in the gradation of the original image and a change rate of the area of the second dot pattern relative to the change in the gradation of the original image differ. In other words, the second embodiment of the present invention differs from the first embodiment of the present invention in the dither matrices used in halftone processing. The second embodiment of the present invention will described below around points that differ from the first embodiment of the present invention. Components substantially identical to the first embodiment of the present invention are labeled with the same reference signs and description thereof is omitted.

2-1. Functional Configuration of Printer

Figure 9:
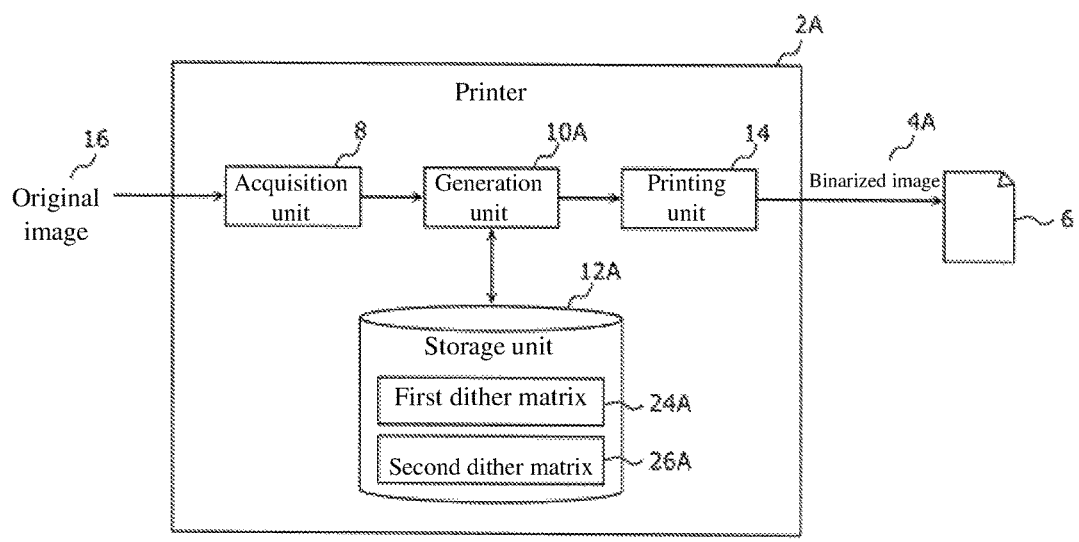
FIG. 9 is a block diagram illustrating a functional configuration of a printer according to a second embodiment of the present invention.

A functional configuration of a printer 2A according to the second embodiment of the present invention is described with reference to FIG. 9 and FIGS. 10A-10B. FIG. 9 is a block diagram illustrating the functional configuration of the printer 2A according to the second embodiment of the present invention. FIGS. 10A-10B are diagrams illustrating an example of halftone processing according to the printer 2A according to the second embodiment of the present invention.

As illustrated in FIG. 9, the printer 2A according to the second embodiment of the present invention includes the acquisition unit 8, a generation unit 10A, a storage unit 12A, and the printing unit 14.

The generation unit 10A generates a binarized image 4A from the original image 16 by executing halftone processing using any of a plurality of dither matrices including a first dither matrix 24A and a second dither matrix 26A on each of the plurality of regions 19 in the original image 16.

For example, the generation unit 10A performs halftone processing using any among the first dither matrix 24A and the second dither matrix 26A on each of the four regions 19a, 19b, 19c 19d in the original image 16 illustrated in FIG. 10A. Specifically, the generation unit 10A generates cells 30Aa, 30Ad formed with a first dot pattern 20A by performing halftone processing on the regions 19a, 19d using the first dither matrix 24A. Moreover, the generation unit 10A generates cells 30Ab, 30Ac formed with a second dot pattern 22A by performing halftone processing on the regions 19b, 19c using the second dither matrix 26A.

The first dot pattern 20A and the second dot pattern 22A are disposed lined up alternatingly in a row direction and a column direction of a plurality of cells 30A. That is, the first dither matrix 24A and the second dither matrix 26A are applied alternatingly to the plurality of regions 19 lined up in the row direction and the column direction. As a result, as illustrated in FIG. 10B, a pair of adjacent first dot patterns 20A is disposed lined up in a direction tilted 45 degrees respectively from the row direction and the column direction of the plurality of cells 30A. Similarly, a pair of adjacent second dot patterns 22A is disposed lined up in a direction tilted 45 degrees respectively from the row direction and the column direction of the plurality of cells 30A.

The storage unit 12A stores the first dither matrix 24A, which is for forming the first dot pattern 20A, and the second dither matrix 26A, which is for forming the second dot pattern 22A. The first dither matrix 24A has a plurality of first thresholds as matrix elements. Moreover, the second dither matrix 26A has a plurality of second thresholds as matrix elements.

[2-2. First Dither Matrix and Second Dither Matrix]

Figure 11A:
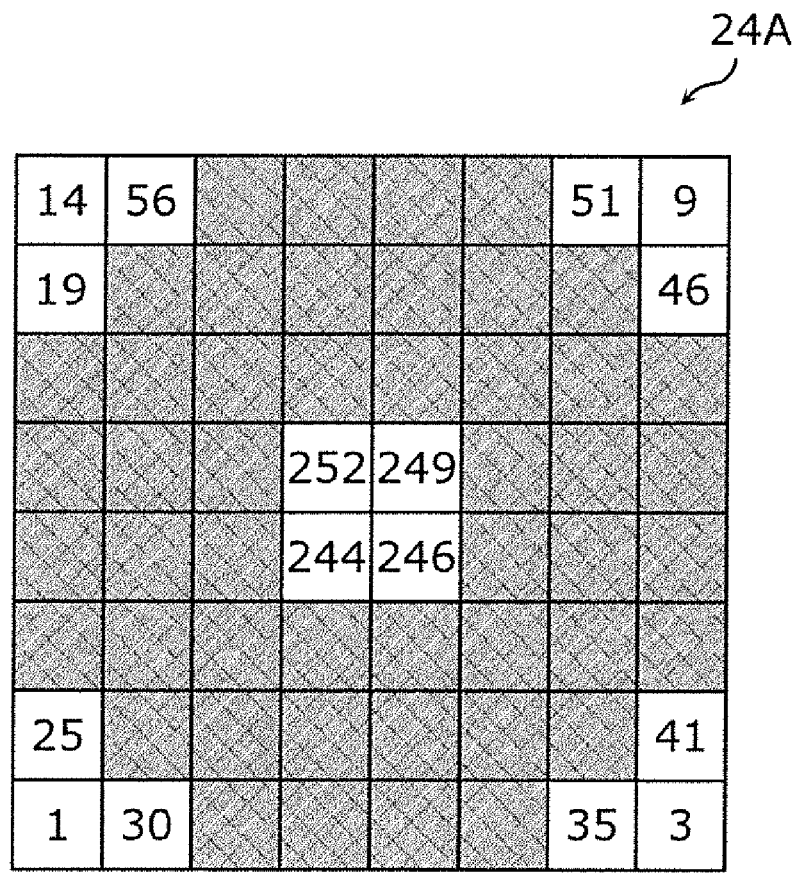
FIG. 11A is a diagram illustrating an example of a first dither matrix according to the second embodiment of the present invention.
Figure 11B:
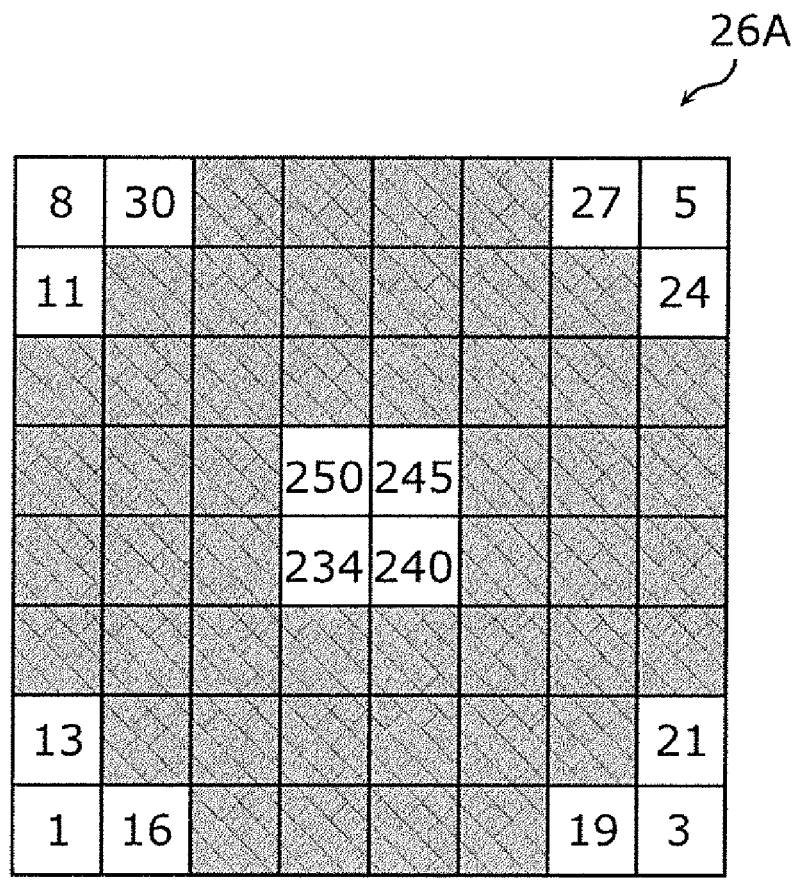
FIG. 11B is a diagram illustrating an example of a second dither matrix according to the second embodiment of the present invention.

Here, the first dither matrix 24A and the second dither matrix 26A are described with reference to FIG. 11A and FIG. 11B. FIG. 11A is a diagram illustrating an example of the first dither matrix 24A according to the second embodiment of the present invention. FIG. 11B is a diagram illustrating an example of the second dither matrix 26A according to the second embodiment of the present invention. In FIG. 11A and FIG. 11B, to conceal several thresholds, a region of a portion of the first dither matrix 24A and the second dither matrix 26A is applied with hatching.

As illustrated in FIG. 11A and FIG. 11B, with both the first dither matrix 24A and the second dither matrix 26A, a threshold disposed in a center region has a value more on a highlight side than a threshold disposed in a peripheral region. By this, when each gradation value of all pixels 18 included in the region 19 of the original image 16 changes from being farthest on the highlight side to being farthest on a shadow side, the first dot pattern 20A and the second dot pattern 22A enlarge from the center region to the peripheral region of the cell 30A.

A change in a first threshold in the center region of the first dither matrix 24A is less than a change in a second threshold in the center region of the second dither matrix 26A. Conversely, a change in a first threshold in the peripheral region of the first dither matrix 24A is greater than a change in a second threshold in the peripheral region of the second dither matrix 26A. In other words, when the plurality of first thresholds included in the first dither matrix 24A and the plurality of second thresholds included in the second dither matrix 26A are respectively lined up in order from the highlight side to the shadow side, i) the change in the first thresholds is less than the change in the second thresholds on a highlight side of an intermediate gradation and ii) the change in the first thresholds is greater than the change in the second thresholds on a shadow side of the intermediate gradation.

For example, in FIG. 11A, when the first thresholds are lined up from the highlight side to the shadow side, the first thresholds are lined up as " . . . , 19, 14, 9, 3, 1." Moreover, for example, in FIG. 11B, when the second thresholds are lined up from the highlight side to the shadow side, the second thresholds are lined up as " . . . , 11, 8, 5, 3, 1." At this time, on the shadow side of the intermediate gradation, the change in the first thresholds (for example, the total of differences between adjacent thresholds: 18=(19−14)+(14−9)+(9−3)+(3−1)) is greater than the change in the second thresholds (for example, the total of differences between adjacent thresholds: 10=(11−8)+(8−5)+(5−3)+(3−1)). The change in the thresholds may be evaluated by another statistic such as a distribution or a standard deviation instead of the difference between adjacent thresholds.

The intermediate gradation is a gradation in an intermediate range between a range of a gradation farthest on the highlight side (first range) and a range of a gradation farthest on the shadow side (second range). For example, the intermediate gradation may be a gradation in the middle of the gradation farthest on the highlight side and the gradation farthest on the shadow side (for example, 127 and 128 in 8-bit) or a gradation shifted to the highlight side or the shadow side from this middle gradation (for example, 100, 150, and the like in 8-bit). The first range is a range of gradation values equal to or greater than a first predetermined value (for example, 192 in 8-bit). Moreover, the second range is a range of gradation values equal to or less than a second predetermined value less than the first predetermined value (for example, 64 in 8-bit).

[2-3. First Dot Pattern and Second Dot Pattern]

Figure 12:
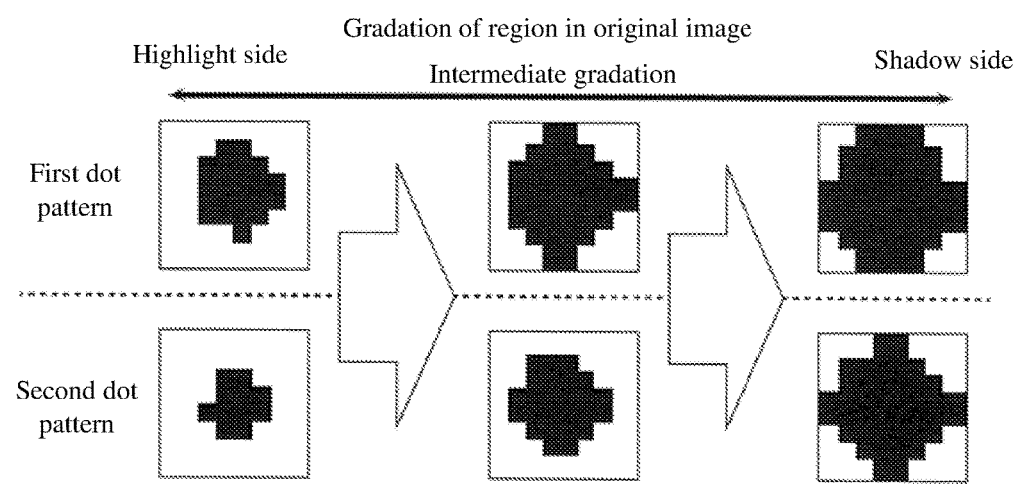
FIG. 12 is a diagram schematically illustrating a first dot pattern and a second dot pattern growing according to the second embodiment of the present invention.
Figure 13:
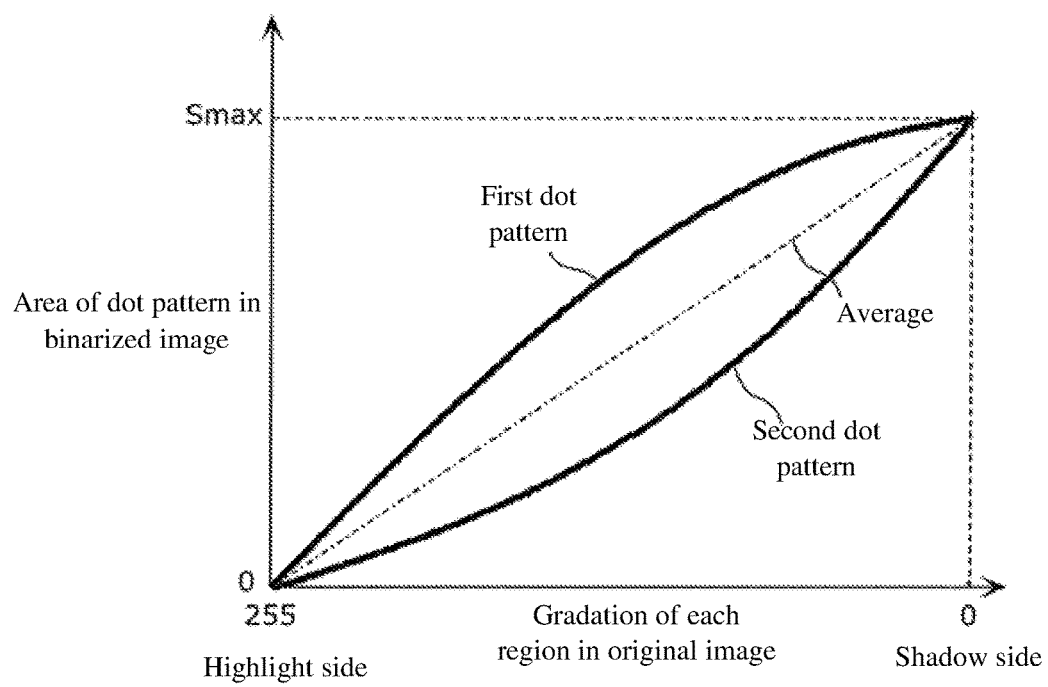
FIG. 13 is a graph illustrating a relationship between a gradation of each region in the original image and an area of the dot pattern in a binarized image.

Next, the first dot pattern 20A and the second dot pattern 22A are described with reference to FIG. 12 and FIG. 13. FIG. 12 is a diagram schematically illustrating the first dot pattern 20A and the second dot pattern 22A according to the second embodiment of the present invention growing. FIG. 13 is a graph illustrating a relationship between the gradation of each region in the original image and the area of the dot pattern in the binarized image.

As illustrated in FIG. 12 and FIG. 13, a change rate of an area of the first dot pattern 20A relative to the change in gradation value in each region of the original image 16 differs from a change rate of an area of the second dot pattern 22A relative to this change in gradation value. Specifically, when the gradation value changes from a gradation on the highlight side to an intermediate gradation in each region of the original image 16, an increase rate of the area of the first dot pattern 20A is greater than an increase rate of the area of the second dot pattern 22A. Conversely, when the gradation value changes from an intermediate gradation to a gradation on the shadow side in each region of the original image 16, the increase rate of the area of the first dot pattern 20A is less than the increase rate of the area of the second to pattern 22A.

This difference in increase rates of the areas of the first dot pattern 20A and the second dot pattern 22A arises due to a difference between the first dither matrix 24A and the second dither matrix 26A. Specifically, by the change in a threshold on the highlight side disposed in the center region of the second dither matrix 26A being comparatively large, when the gradation value changes from a gradation on the highlight side to an intermediate gradation in each region of the original image 16, the increase rate of the area of the second dot pattern 22A becomes less than the increase rate of the area of the first dot pattern 20A. Conversely, by the change in a threshold on the shadow side disposed in the peripheral region of the first dither matrix 24A being comparatively large, when the gradation value changes from an intermediate gradation to a gradation on the shadow side in each region of the original image 16, the increase rate of the area of the first dot pattern 24A becomes less than the increase rate of the area of the second dot pattern 22A.

As illustrated in FIG. 13, the areas of the first dot pattern 20A and the second dot pattern 22A increase monotonically as the gradation value of each region of the original image 16 changes from the highlight side to the shadow side. Here, the area increasing monotonically signifies that the area is not decreasing.

Furthermore, in a two-dimensional cartesian coordinate system defined by a horizontal axis indicating the gradation of each region of the original image 16 and a vertical axis indicating the area of the dot pattern, i) the area of the first dot pattern 20A is approximated by an upwardly-convex curve and ii) the area of the second dot pattern is approximated by a downwardly-convex curve.

For example, if the gradation of the original image 16 is multiplied by a (a being any value) for maintaining consistency with the gradation of the original image, an average or a total of the area of the first dot pattern 20A and the area of the second dot pattern 22A may be multiplied by a. That is, the gradation of the original image 16 and the average or the total of the area of the first dot pattern 20A and the area of the second dot pattern 22A are in a proportional relationship. For example, as illustrated in FIG. 13, the average of the area of the first dot pattern and the area of the second dot pattern is represented by a straight line passing through a point where the gradation value is 255, the farthest on the highlight side, and the area is 0, a minimum value, and a point where the gradation value is 0, the farthest on the shadow side, and the area is Smax, a maximum value.

In the second embodiment of the present invention, one or more of the following effects may be obtained. As above, according to the printer 2A according to one or more embodiments of the present invention, the change rate of the area relative to the change in the gradation of the original image 16 differs between the first dot pattern 20A and the second dot pattern 22A. As a result, the change in the gradation of the original image 16 can be expressed by a combination of the first dot pattern 20A and the second dot pattern 22A and the gradation of the original image 16 can be expressed to high precision in the binarized image.

Furthermore, according to the printer 2A according to one or more embodiments of the present invention, when the original image 16 changes from a gradation on the highlight side to an intermediate gradation, the area change rate of the second dot pattern 22A can be made less than the area change rate of the first dot pattern 20A. That is, on the highlight side, the gradation can be expressed at a high resolution using the second dot pattern 22A. Meanwhile, when the original image 16 changes from an intermediate gradation to a gradation on the shadow side, the area change rate of the first dot pattern 20A can be made less than the area change rate of the second dot pattern 22A. That is, on the shadow side, the gradation can be expressed at a high resolution using the first dot pattern 22A. Therefore, by combining the first dot pattern 20A and the second dot pattern 22A, the gradation can be expressed at a high resolution in a wide range, from the highlight side to the shadow side, and the gradation of the original image 16 can be expressed to higher precision in the binarized image.

Figure 14A:
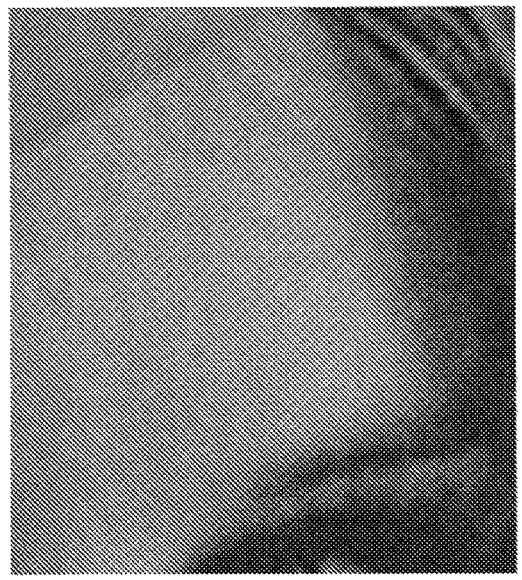
FIG. 14A is a diagram illustrating an example of the original image.
Figure 14B:
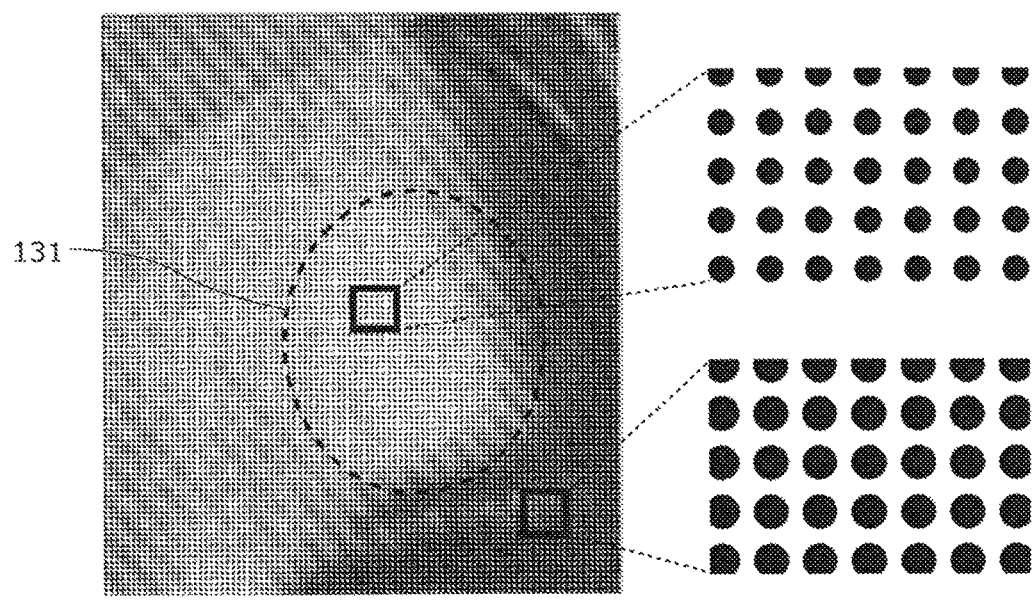
FIG. 14B is a diagram illustrating an example of a binarized image in a comparative example.
Figure 14C:
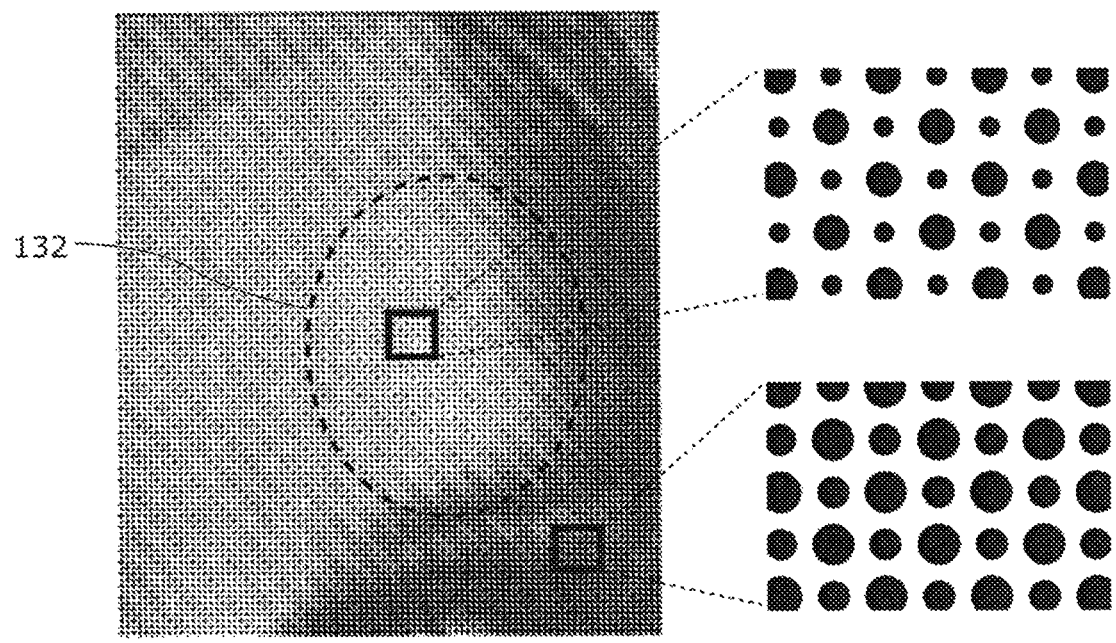
FIG. 14C is a diagram illustrating an example of the binarized image according to the second embodiment of the present invention.

For example, FIG. 14A is a diagram illustrating an example of the original image. FIG. 14B is a diagram illustrating an example of a binarized image in a comparative example. That is, FIG. 14B is an example of a binarized image generated from the original image by performing halftone processing using one type of dither matrix. FIG. 14C is a diagram illustrating an example of the binarized image in the second embodiment of the present invention. It is apparent that in a region 132 in FIG. 14C the gradation of the binarized image is improved compared to a region 131 in FIG. 14B. As clear from the enlarged diagrams, this may be one or more of the effects of the gradation being expressed by one type of dot pattern in FIG. 14B while the gradation in FIG. 14C is expressed by a combination of two types of dot patterns with different area change rates.

Furthermore, according to the printer 2A according to one or more embodiments of the present invention, as the gradation of each region of the original image 16 changes from the highlight side to the shadow side, the respective areas of the first dot pattern 20A and the second dot pattern 22A can be increased monotonically. Therefore, the area of the dot pattern changing unnaturally relative to the change in the gradation of the original image 16 can be prevented and the gradation of the original image 16 can be expressed to higher precision in the binarized image.

Furthermore, according to the printer 2A according to one or more embodiments of the present invention, the area of the first dot pattern 20A and the area of the second dot pattern 22A can be approximated by an upwardly-convex curve and a downwardly-convex curve. Therefore, the areas of the dot patterns can be changed smoothly relative to the change in the gradation of the original image 16 and the gradation of the original image 16 can be expressed to higher precision in the binarized image.

According to the printer 2A according to one or more embodiments of the present invention, when the original image changes from a gradation on the highlight side to an intermediate gradation, the area change rate of the second dot pattern 22A can be kept lower than the area change rate of the first dot pattern 20A. That is, on the highlight side, the gradation can be expressed at a high resolution using the second dot pattern 22A. Meanwhile, when the original image changes from an intermediate gradation to a gradation on the shadow side, the area change rate of the first dot pattern 20A can be kept lower than the area change rate of the second dot pattern 22A. That is, on the shadow side, the gradation can be expressed at a high resolution using the first dot pattern 20A. Therefore, by combining the first dot pattern 20A and the second dot pattern 22A, the gradation can be expressed at a high resolution in a wide range, from the highlight side to the shadow side, and the gradation of the original image can be expressed to higher precision in the binarized image.

Furthermore, according to the printer 2A according to one or more embodiments of the present invention, the first cell wherein the first dot pattern 20A is formed and the second cell wherein the second dot pattern 22A is formed can be disposed in a matrix, lined up alternatingly in the row direction and the column direction. Therefore, turbulence in the gradation of the binarized image due to uneven distribution of the first dot pattern 20A and the second dot pattern 22A can be prevented and the gradation of the original image can be expressed to higher precision in the binarized image.

Third Embodiment

Next, a third embodiment of the present invention will be described below. The third embodiment of the present invention differs from the first and second embodiments of the present invention in that a noise component is superimposed on the dither matrices. The third embodiment of the present invention is described below around points that differ from the first and second embodiments of the present invention. Components substantially identical to the first and second embodiments of the present invention are labeled with the same reference signs and description thereof is omitted.

(3-1. Functional Configuration of Printer)

Figure 15:
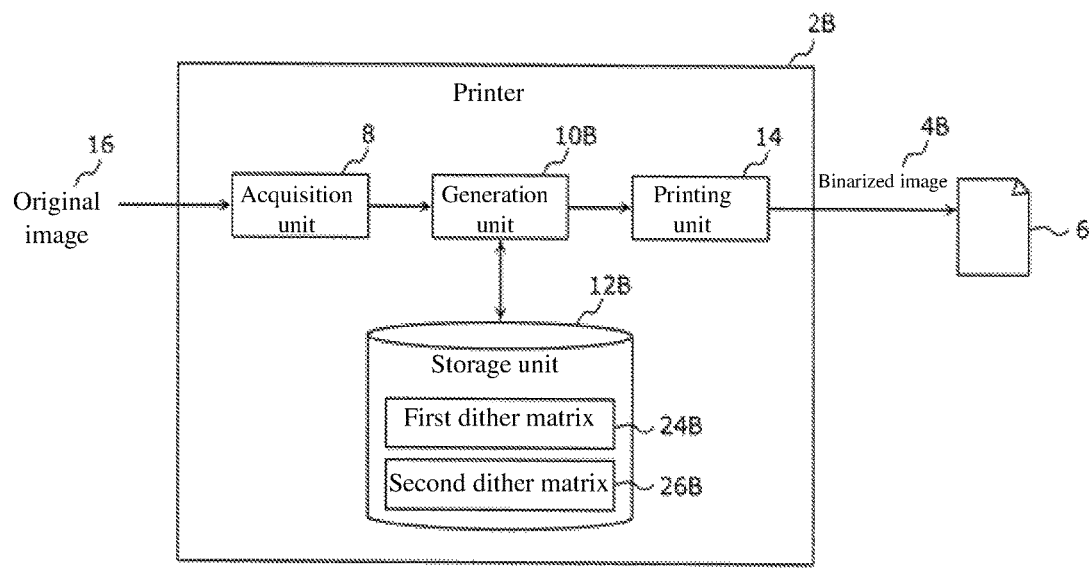
FIG. 15 is a block diagram illustrating a functional configuration of a printer according to a third embodiment of the present invention.

Next, a functional configuration of a printer 2B according to the third embodiment of the present invention will be described below with reference to FIG. 15. FIG. 15 is a block diagram illustrating the functional configuration of the printer 2B according to the third embodiment of the present invention.

As illustrated in FIG. 15, the printer 2B according to the third embodiment of the present invention includes the acquisition unit 8, a generation unit 10B, a storage unit 12B, and the printing unit 14.

The generation unit 10B generates a binarized image 4B from the original image 16 by executing halftone processing using any of a plurality of dither matrices including a first dither matrix 24B and a second dither matrix 26B on each of the plurality of regions 19 in the original image 16.

The storage unit 12B stores the first dither matrix 24B and the second dither matrix 26B. The first dither matrix 24B and the second dither matrix 26B are the first dither matrix 24A and the second dither matrix 26A of the second embodiment of the present invention superimposed with a noise component. That is, the first dither matrix 24B adds a noise value to the plurality of first thresholds included in the first dither matrix 24A. Moreover, the second dither matrix 26B adds a noise value to the plurality of second thresholds included in the second dither matrix 26A.

The noise component is, for example, a uniform random number. That is, the noise component is a random number given according to a continuous uniform distribution. Specifically, the noise component is a random number given at the same probability in an interval centered around, for example, 0 (for example, no less than −2 and no greater than 2).

Furthermore, the noise component may be a normal random number. That is, the noise component is a random number given according to a normal distribution. Specifically, the noise component is a random number given at a probability according to, for example, a normal distribution $N(\mu, \sigma^2)$ defined by an average $\mu$ (for example, $\mu=0$) and a distribution $\sigma^2$ (for example, $\sigma^2=_1$).

As above, according to the printer 2B according to one or more embodiments of the present invention, the plurality of dither matrices superimposed with the noise component can be used in halftone processing and the gradation of the original image 16 can be expressed to higher precision in the binarized image.

For example, in a situation where a gradation image (original image) whose gradation gradually changes from 0 to 255 was halftone-processed using one type of dither matrix, an average error value between the original image and the binarized image was 80.82. Meanwhile, in a situation where halftone processing was performed using two types of dither matrices as in the second embodiment of the present invention, the average error value between the original image and the binarized image improved to 80.11. Then, in a situation where halftone processing is performed using two types of dither matrices superimposed with a uniform random number as in one or more embodiments of the present invention, the average error value between the original image and the binarized image further improved to 80.07. Moreover, in a situation where halftone processing is performed using two types of dither matrices superimposed with a normal random number, the average error value between the original image and the binarized image further improved to 80.05. Here, the average error value is calculated by dividing a sum total of difference absolute values between corresponding pixels between the original image and the binarized image by a pixel count.

Fourth Embodiment

Next, a fourth embodiment of the present invention will be described below. The fourth embodiment of the present invention differs from the first to third embodiments of the present invention in that a noise component according to each region in the original image is superimposed on the dither matrix used in halftone-processing this region. The fourth embodiment of the present invention will be described below around points that differ from the first to third embodiments of the present invention. Components substantially identical to the first to third embodiments of the present invention are labeled with the same reference signs and description thereof is omitted.

(4-1. Functional Configuration of Printer)

Figure 16:
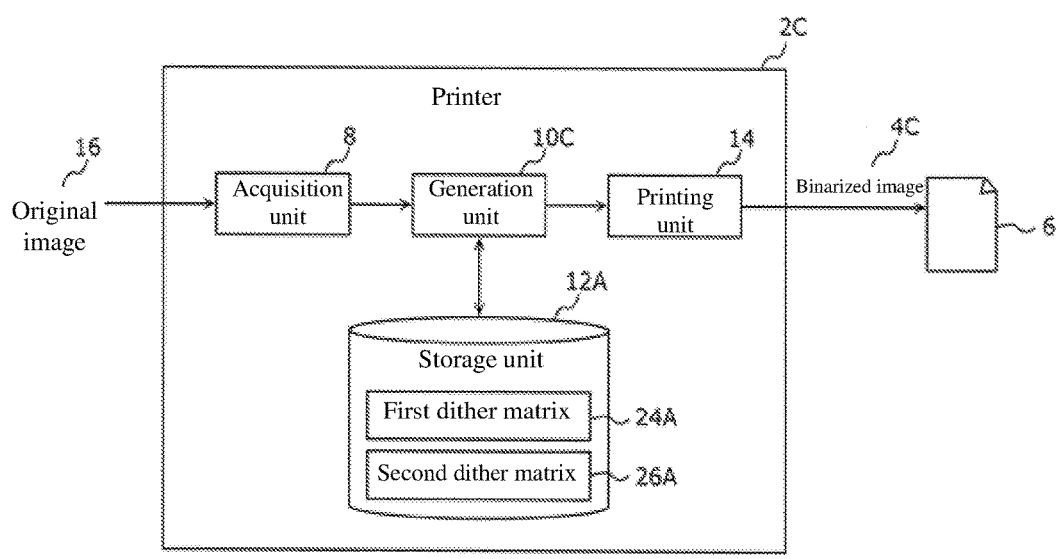
FIG. 16 is a block diagram illustrating a functional configuration of a printer according to a fourth embodiment of the present invention.

Next, a functional configuration of a printer 2C according to the fourth embodiment of the present invention will be described with reference to FIG. 16. FIG. 16 is a block diagram illustrating the functional configuration of the printer 2C according to the fourth embodiment of the present invention.

As illustrated in FIG. 16, the printer 2C includes the acquisition unit 8, a generation unit 10C, the storage unit 12A, and the printing unit 14.

The generation unit 10C generates a binarized image 4C from the original image 16 by executing halftone processing using any of a plurality of dither matrices including a first dither matrix and a second dither matrix on each of the plurality of regions 19 in the original image 16. At this time, the generation unit 10C, for each region in the original image 16, superimposes a noise component according to this region on the dither matrix used in halftone-processing this region. Therefore, a dither matrix superimposed with a noise component for each region is used in halftone processing.

(4-2. Flow of Processing According to Printer)

Figure 17:
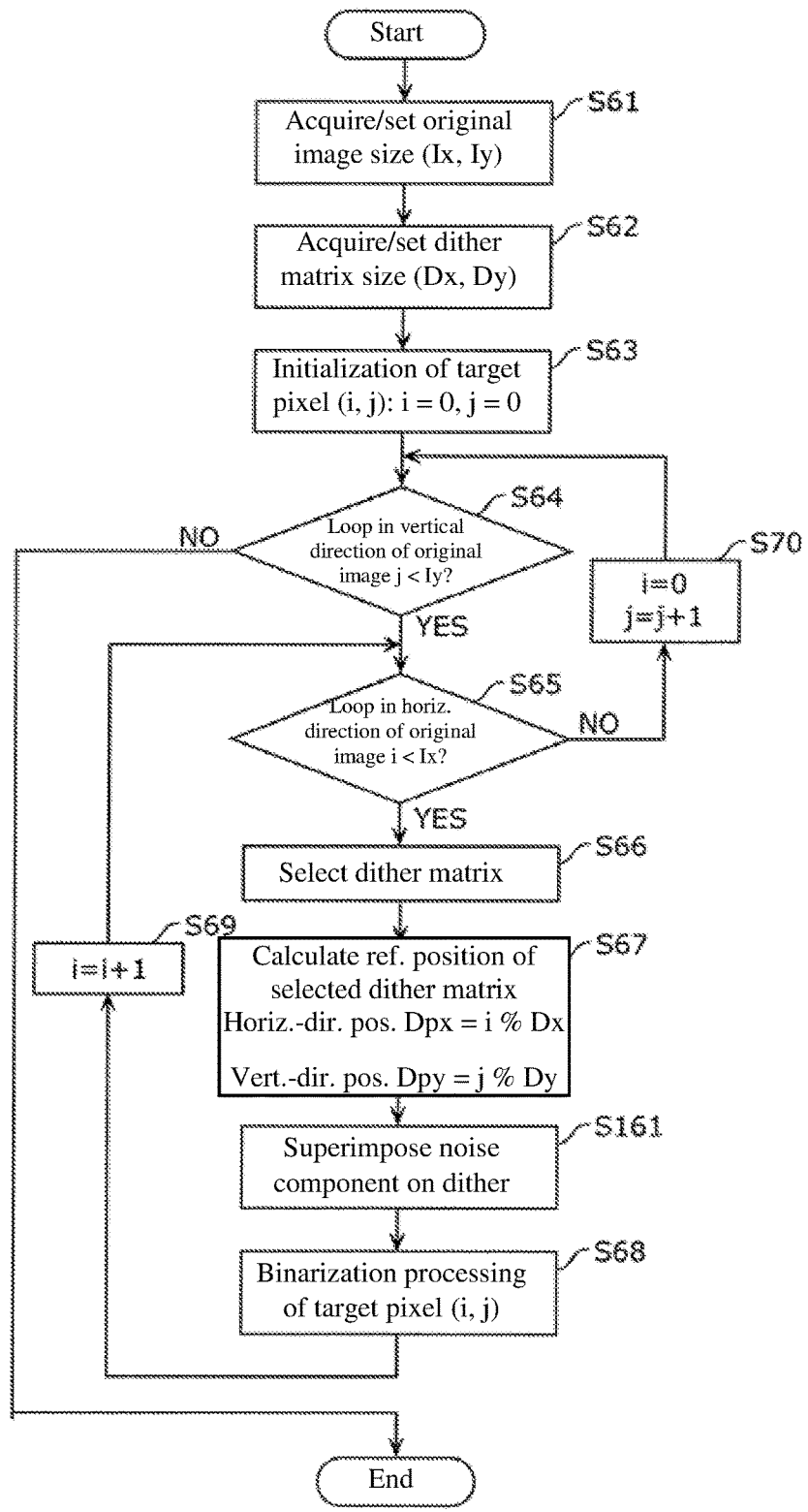
FIG. 17 is a flowchart illustrating details of halftone processing by the printer according to the fourth embodiment of the present invention.

Here, details of the halftone processing at step S6 in FIG. 6A in one or more embodiments of the present invention are described with reference to FIG. 17. FIG. 17 is a flowchart illustrating the details of halftone processing by the printer 2C according to the fourth embodiment of the present invention. In FIG. 17, steps substantially identical to FIG. 6B are labeled with the same reference signs and description thereof is omitted.

First, after the reference position of the dither matrix (Dpx, Dpy) is calculated at step S66, the generation unit 10C superimposes a noise component on the values of the dither matrix in this reference position (S161). For example, the generation unit 10C adds a value of a noise component obtained using a sum of i and j as a random seed to the values of the dither matrix in this reference position. The noise component is, for example, a uniform random number, a normal random number, or the like.

Using the dither matrix superimposed with the noise component, binarization processing is performed on the target pixel (S67).

As above, according to the printer 2C according to the fourth embodiment of the present invention, a noise component can be superimposed on the plurality of dither matrices and the gradation of the original image can be expressed to higher precision in the binarized image.

Furthermore, according to the printer 2C according to the fourth embodiment of the present invention, for each region, a noise component according to this region can be superimposed on the dither matrix. Therefore, a number of dot-pattern types can be increased and the gradation of the original image can be expressed to higher precision in the binarized image.

Furthermore, according to the printer 2C according to the fourth embodiment of the present invention, a uniform random number or a normal random number can be used as the noise component, the gradation of the original image can be expressed to higher precision in the binarized image, and the noise component can be readily superimposed on the dither matrix.

Other Embodiments

Printers that are examples of the image processing apparatus according to one or more embodiments of the present invention are described above, but the present invention is not limited thereto. For example, the first to fourth embodiments of the present invention may be combined as appropriate.

For example, the first embodiment of the present invention and any of the second to fourth embodiments of the present invention may be combined. Specifically, in the second to fourth embodiments of the present invention, the second dot pattern, when the gradation value is changed from the highlight side to the shadow side in each region of the original image, may enlarge from the peripheral region to the center region of the second cell. As a result, reducing perceived roughness in the binarized image and improvement of the gradation can be obtained.

For example, the modified example of the first embodiment of the present invention may be applied to any of the second to fourth embodiments of the present invention. Specifically, in the second to fourth embodiments of the present invention, halftone processing may be performed using the integrated dither matrix obtained by integrating the first dither matrix and the second dither matrix.

For example, in each embodiment above, the printer was a laser printer but is not limited thereto and may be, for example, an inkjet printer, a multifunction peripheral/printer (MFP), or the like. In a situation where the printer 2 is an MFP, the acquisition unit 8 may acquire an original image 16 read by a scanner. Moreover, in the situation where the printer 2 is an MFP, the printing unit 14 may form a large number of dot patterns on the paper 6 by discharging the black ink from a recording head (not illustrated) toward the paper 6 at appropriate timings while reciprocating the recording head in a direction substantially perpendicular to a conveyance direction of the paper 6.

Furthermore, in the first to fourth embodiments of the present invention, a situation is described where the image processing apparatus is a printer, but the present invention is not limited thereto. The image processing apparatus may be a mobile terminal such as a smartphone or a tablet computer. In this situation, the generated binarized image may be output to a printer or displayed on a display unit.

For example, in the first to fourth embodiments of the present invention, two types of dot patterns are formed in the binarized image 4, but the present invention is not limited thereto; for example, three or more types of dot patterns may be formed. That is, halftone processing may be performed using three or more dither matrices.

For example, in the first to fourth embodiments of the present invention, a pair of adjacent first dot patterns is disposed lined up in a direction respectively tilted 45 degrees from the row direction and the column direction of a plurality of cells, but the present invention is not limited thereto; these may be disposed lined up in a direction tilted at any angle (for example, 30 degrees). Similarly, with the second dot pattern, these may be disposed lined up in a direction tilted at any angle (for example, 30 degrees) from the row direction and the column direction of the plurality of cells.

Furthermore, the image processing apparatus above may be configured as a computer system configured specifically from a microprocessor, a ROM, a RAM, a hard disk drive, a display unit, a keyboard, a mouse, and the like. A computer program is stored in the ROM or the hard disk drive. The image processing apparatus achieves a function thereof by the microprocessor operating according to the computer program. Here, the computer program is configured by a combination of a plurality of command codes indicating instructions to a computer to achieve a predetermined function.

Furthermore, a portion or an entirety of the components configuring the image processing apparatus above may be configured from one system LSI (large-scale integration). A system LSI is a super-multifunction LSI manufactured by integrating a plurality of configuring units on one chip and includes a computer system configured including, for example, a microprocessor, a ROM, a RAM, and the like. In this situation, a computer program is stored in the ROM. The system LSI achieves a function thereof by the microprocessor operating according to the computer program.

Furthermore, after LSI manufacture, the integrated circuit may use a field-programmable gate array (FPGA) that can be programmed.

Furthermore, a portion or an entirety of the components configuring the image processing apparatus above may be configured from an IC card that is removable from the image processing apparatus or a standalone module. The IC card or the module is a computer system configured from a microprocessor, a ROM, a RAM, and the like. The IC card or the module may include the super-multifunctional LSI above. The IC card or the module achieves a function thereof by the microprocessor operating according to a computer program. This IC card or this module may have tampering resistance.

Furthermore, one or more embodiments of the present invention may be the method illustrated above. Moreover, one or more embodiments of the present invention may be a computer program that realizes this method by a computer or a digital signal consisting of the computer program above.

Furthermore, one or more embodiments of the present invention may be a recording of the computer program above or the digital signal above on a computer-readable, non-temporary recording medium such as a flexible disk, a hard disk, a CD-ROM, an MO, a DVD, a DVD-ROM, a DVD-RAM, a BD (Blu-ray Disc (registered trademark)), or a semiconductor memory. Moreover, one or more embodiments of the present invention may be the digital signal above recorded on such a non-temporary recording medium.

Furthermore, one or more embodiments of the present invention may be the computer program above or the digital signal above transferred via a network, as represented by a telecommunication line, a wireless or wired communication line, and the Internet; a data broadcast; or the like.

Furthermore, one or more embodiments of the present invention may be a computer system including a microprocessor and a memory where the memory above stores the computer program above and the microprocessor above operates according to the computer program above.

Furthermore, it may also be implemented by another independent computer system by recording the program above or the digital signal above on the non-temporary recording medium above and transferring this medium or transferring the program above or the digital signal above via the network or the like above.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

2, 2A, 2B, 2C Printer
4, 4A, 4B, 4C Binarized image
6 Paper
8 Acquisition unit
10, 10A, 10B, 10C Generation unit
12, 12A, 12B Storage unit
14 Printing unit 16 Original image
18, 28 Pixel
19 Region
20, 20A First dot pattern
22, 22A Second dot pattern
24, 24A, 24B First dither matrix
25 Integrated dither matrix
26, 26A, 26B Second dither matrix
30, 30A Cell

What is claimed is:

1. An image processing apparatus, comprising:
a scanner that acquires an image; and
a processor that:
changes a first area of a plurality of first dot patterns in accordance with a gradation value in the image using a first dither matrix;
changes a second area of a plurality of second dot patterns in accordance with the gradation value using a second dither matrix differ; and
causes the plurality of first dot patterns and the plurality of second dot patterns to be formed on a print medium and generates a binary image based on the plurality of first dot patterns and the plurality of second dot patterns,
wherein a first ratio of change of the first area to change of the gradation value differs from a second ratio of change of the second area to change of the gradation value,
wherein the binary image includes a first cell where the first dot pattern is formed and a second cell where the second dot pattern is formed, and
wherein the first cell and the second cell are disposed alternatingly in a row direction and a column direction in the binary image.

2. The image processing apparatus according to claim 1, wherein, in the binary image, the plurality of first dot patterns and the plurality of second dot patterns are disposed alternatingly.

3. The image processing apparatus according to claim 2, wherein, in the binary image, disposition of the plurality of first dot patterns or the plurality of second dot patterns is substantially 45 degrees apart.

4. The image processing apparatus according to claim 1, wherein, in the binary image,
the first dot pattern enlarges from a center region to a peripheral region of the first cell, and
the second dot pattern enlarges from a peripheral region to a center region of the second cell.

5. The image processing apparatus according to claim 1, wherein ranges of an index value relating to a brightness of the image include:
a first range where the index value is at or above a first predetermined value,
a second range where the index value is at or below a second predetermined value less than the first predetermined value, and
an intermediate range where the index value is between the first predetermined value and the second predetermined value, and
wherein, in a predetermined region included in the image, when the index value changes from the intermediate range to the second range, an increase rate of the first area is less than an increase rate of the second area.

6. The image processing apparatus according to claim 5, wherein the first area and the second area increases monotonically as a gradation of the predetermined region changes from the first range to the second range.

7. The image processing apparatus according to claim 6, wherein in a two-dimensional cartesian coordinate system defined by a horizontal axis indicating a gradation of each region of the image and a vertical axis indicating an area of a dot pattern,
i) the first area is approximated by an upwardly-convex curve, and
ii) the second area is approximated by a downwardly-convex curve.

8. The image processing apparatus according to claim 7, wherein the gradation and an average or a total of the first area and the second area are in a proportional relationship.

9. The image processing apparatus according to claim 1, wherein the processor superimposes a noise component on the first and second dither matrices.

10. The image processing apparatus according to claim 9, wherein the processor, for each region in the image, superimposes a noise component according to this region on the first and second dither matrices.

11. The image processing apparatus according to claim 9, wherein the noise component is a uniform random number.

12. The image processing apparatus according to claim 9, wherein the noise component is a normal random number.

13. The image processing apparatus according to claim 1, further comprising:
a memory that stores the first and second dither matrices.

14. A method of generating a binarized image in an image processing apparatus, the method comprises:
acquiring, with a scanner of the image processing apparatus, an image;
changing, with a processor of the image processing apparatus, a first area of a plurality of first dot patterns in accordance with a gradation value in the image using a first dither matrix;
changing, with the processor, a second area of a plurality of second dot patterns in accordance with a gradation value using a second dither matrix;
causing, with the processor, the plurality of first dot patterns and the plurality of second dot patterns to be formed on a print medium; and
generating, with the processor, a binary image based on the plurality of first dot patterns and the plurality of second dot patterns,
wherein a first ratio of change of the first area to change of the gradation value differs from a second ratio of change of the second area to change of the gradation value,
wherein the binary image includes a first cell where the first dot pattern is formed and a second cell where the second dot pattern is formed, and
wherein the first cell and the second cell are disposed alternatingly in a row direction and a column direction in the binary image.

15. The method according to claim 14,
wherein, in the binary image,
the first dot pattern enlarges from a center region to a peripheral region of the first cell, and
the second dot pattern enlarges from a peripheral region to a center region of the second cell.

16. The method according to claim 14,
wherein ranges of an index value relating to a brightness of the image include:
a first range where the index value is at or above a first predetermined value,
a second range where the index value is at or below a second predetermined value less than the first predetermined value, and an intermediate range where the index value is between the first predetermined value and the second predetermined value, and wherein, in a predetermined region included in the image, when the index value changes from the intermediate range to the second range, an increase rate of the first area is less than an increase rate of the second are.

* * * * *